(12) United States Patent
Wahl

(10) Patent No.: US 7,977,818 B1
(45) Date of Patent: Jul. 12, 2011

(54) SAFETY DEVICE FOR PLUG AND PLAY SOLAR ENERGY SYSTEM

(76) Inventor: Eric R. Wahl, New Castle, CO (US)

( * ) Notice: Subject to any disclaimer, the term of this patent is extended or adjusted under 35 U.S.C. 154(b) by 0 days.

(21) Appl. No.: 13/013,488

(22) Filed: Jan. 25, 2011

(51) Int. Cl.
 *H02J 3/38* (2006.01)
(52) U.S. Cl. ............................ 307/53; 307/45
(58) Field of Classification Search .................. 307/53, 307/45
See application file for complete search history.

(56) References Cited

U.S. PATENT DOCUMENTS

| | | | |
|---|---|---|---|
| 5,898,585 | A | 4/1999 | Sirichote et al. |
| 6,605,881 | B2 | 8/2003 | Takehara et al. |
| 6,671,148 | B2 | 12/2003 | Evans |
| 7,058,482 | B2 | 6/2006 | Fletcher et al. |
| 7,436,641 | B2 | 10/2008 | Holley |
| 7,636,616 | B2 | 12/2009 | Fletcher et al. |
| 7,747,356 | B2 | 6/2010 | Andarawis et al. |
| 7,819,114 | B2 | 10/2010 | Augenbraun et al. |
| 2002/0080535 | A1 | 6/2002 | Swindler et al. |
| 2009/0000654 | A1 | 1/2009 | Rotzoll et al. |
| 2009/0133733 | A1 | 5/2009 | Retti |
| 2009/0283129 | A1 | 11/2009 | Foss |
| 2010/0043868 | A1 | 2/2010 | Sun et al. |
| 2010/0052429 | A1 | 3/2010 | Nethery et al. |
| 2010/0076615 | A1 | 3/2010 | Daniel et al. |
| 2010/0127572 | A1 | 5/2010 | Uselton et al. |
| 2010/0164744 | A1 | 7/2010 | Parker et al. |
| 2010/0194202 | A1 | 8/2010 | Sun |
| 2010/0256934 | A1 | 10/2010 | Rohrbaugh |
| 2010/0299270 | A1 | 11/2010 | Maglaque |
| 2010/0315850 | A1 | 12/2010 | J'Neva Devi et al. |

FOREIGN PATENT DOCUMENTS

| | | |
|---|---|---|
| EP | 2216880 A1 | 11/2010 |
| WO | 0145179 A1 | 6/2001 |
| WO | 2008124144 A1 | 10/2008 |

OTHER PUBLICATIONS

SP2130WGTI-KIT SWEA 260 Watt Solar Kit with Grid Tie Inverter, SWEA Solar and Wind, accessed on SWEA.nl in Jan. 2011.
David Biello, "Plug and Play" Solar Panel Kits Offer Homeowner Affordable Alternative Energy Source, Scientific American (On-line Version), Published Aug. 13, 2010, accessed at www.scientificamerican.com/article.cfm?id=solar-power-in-a-box-sunfish.
Home Energy Monitor Z-Wave Line, Aeon Labs, accessed on-line: http://www.aeon-labs.com/site/products/view/4/.
RS-SE-501 Product Brochure, Secure Circuit Breaker System, Redpine Signals, San Jose, CA.

(Continued)

*Primary Examiner* — Jared J Fureman
*Assistant Examiner* — Dru M Parries
(74) *Attorney, Agent, or Firm* — Alan M. Flum; Stone Creek LLC

(57) ABSTRACT

An apparatus and system for preventing branch circuit current overload in a non-dedicated branch circuit where current is supplied at least in part by a co-generation power system through an electrical receptacle or outlet. Co-generation systems of this type are typically used in residential applications and can include solar photovoltaic systems and wind turbines. The apparatus modulates or adjusts the current flowing into the branch circuit from the co-generation power system so that the apparatus does not cause the combination of current supplied from the utility power grid into the branch circuit and current supplied by the co-generation system into the branch circuit outlet to exceed the branch circuit current capacity.

19 Claims, 16 Drawing Sheets

OTHER PUBLICATIONS

Z. Clifford et al., "A retrofit 60 Hz current sensor for non-intrusive power monitoring at the circuit breaker," Applied Power Electronics Conference and Exposition (APEC), 2010 Twenty-Fifth Annual IEEE, vol., No., pp. 444-451, Feb. 21-25, 2010.

Shimla, Green Ray Debuts SunSine AC Solar Appliance to Ease Installation, published Feb. 5, 2010, Instablogs Inc, www.gizmag.com/greenray-sunsine-ac-modular-solar-panels/14072/, accessed through ProQuest.

Clarian Power: SmartBox Plug-in Solar Power, http://www.clarianpower.com/solar.html, internet site accessed on Dec. 23, 2010.

The Cost of Energy, http://www.grinzo.com/energy/index.php/2010/08/16/assessing-the-clarian-plug-and-play-solar-panels, internet site accessed on Jan. 14, 2011. (Entire article and discussion/comments after the article).

Eric Wesoff, Clarian: Moving Solar to the Mainstream, Jan. 25, 2011, Greentech Media, accessed on the web at: http://www.greentechmedia.com/articles/print/clarian-lowering-the-entry-price-to-solar.

SAFETY DEVICE FOR PLUG AND PLAY SOLAR ENERGY SYSTEM

BACKGROUND

The present invention relates to co-generation power systems, for example, solar photovoltaic or wind-power, connected to non-dedicated branch circuits in a residential or commercial setting. Specifically, the application relates to a safety device for adjusting the current flowing into a non-dedicated branch circuit from a co-generation device.

Utility-interactive solar power or wind power co-generation systems of various sizes are commonly installed on homes and businesses, but implementation can be cumbersome. For example, solar photovoltaic panels and utility-interactive inverters are available and may be configured as effective and safe power generation systems whereby a home may be powered by a combination of utility and solar-generated electricity. However, these systems require installation of a properly sized and dedicated branch circuit or separate electrical service in order to safely add solar generating capacity to a home.

With the use of small co-generation system in a residential or office setting, it may be desirable to supply power from the co-generation system into an existing branch circuit using existing wiring. For example, it may be desirable to supply power from a solar or wind-power co-generation system or device into an existing electrical outlet or receptacle already present in a home or business.

It is common in residential and commercial wiring, to have non-dedicated or general branch circuits. A non-dedicated branch circuit can have several outlets or receptacles, each receptacle capable of supplying power to different devices or loads. Branch circuits originate at an electrical service panel or breaker box. Electricity is supplied from the power utility into the branch circuit through a circuit protection device, typically a circuit breaker. The breaker prevents the flow of current from the power utility into the branch circuit when the current required by one or more loads on the branch exceeds the rated current capacity of the branch circuit. However, when a co-generation system also supplies power into a non-dedicated branch circuit, the current from the co-generation system can flow directly through the branch circuit to the load and bypass the circuit breaker. This creates the potentially dangerous situation where the combination of utility supplied current and co-generation system supplied current together exceed the current capacity of the branch circuit.

While systems have been proposed that connect small residential and commercial PV solar and wind power systems through AC outlets or receptacles, none have adequately addressed the problem that the rated current capacity of a non-dedicated branch circuit can be exceeded when one or more loads are connected to the branch circuit. Therefore, the need exists to provide a device that prevents current overload in a non-dedicated branch circuit supplied by both utility power and a co-generation device.

SUMMARY

The present inventor observed that preventing current overload in a non-dedicated branch circuit supplied by both utility power and a co-generation device could be accomplished by adjusting the current supplied to the branch by the co-generation device based on knowledge of the current supplied into the non-dedicated branch circuit by both the co-generation device and power utility. To accomplish this, for example, in accordance with principles of the invention, an inverter, or a combination of inverter and digital controller, is adapted to receive information that includes the value of current sensed in proximity to the source of the non-dedicated branch circuit. Current sensed in proximity to the source of the branch circuit is representative of the current flowing through a circuit breaker located at the source of the non-dedicated branch circuit. With knowledge of the current flowing through the circuit breaker, the inverter adjusts the current it supplies into the non-dedicated branch circuit so that the inverter does not cause the total current supplied by both the inverter and the utility to exceed the rated current capacity of the branch circuit.

A utility-interactive solar power or wind power co-generation system includes the power generating device and an inverter. Prior to the present invention, the principle purpose of an utility tied inverter was to (1) convert DC voltage and current supplied by a co-generation device into AC voltage and current synchronized in frequency and phase with the utility supplied power and (2) maximize the power output, and (3) shutdown the power if the utility supplied voltage was not present. One of the main focuses in inverter design is to maximize power output of the system that is presented to a branch circuit. Part of the inventor's contribution is to recognize that the inverter could also be used to limit the current into a non-dedicated branch circuit when loads are present on the branch circuit based on information regarding the current supplied by the utility through the branch circuit. A current sensor, current transformer, current probe, or similar current sensing device that is placed in proximity to the source of the branch circuit can be used to obtain the information. In accordance with principles of the invention, the inverter can be adapted to receive information representing the value of the current sensed in proximity to the source of the branch circuit and adjust its own output current, based in part by the value of sensed current so that the inverter does not cause the total current supplied by both the inverter and the utility to exceed the rated current capacity of the branch circuit.

Alternatively, an apparatus is configured to supply power from a co-generation device into a branch circuit through an electrical receptacle. This apparatus includes an inverter. The inverter is configured to receive a first current from the co-generation device and to supply a second current into the branch circuit through the electrical receptacle. The apparatus further includes means for receiving information representing the value of a third current. The means for receiving the information can include a processor, receiver, transceiver, or other circuit configured to receive data transmitted over the power line. The means for receiving the information can include a processor, receiver, transceiver, or other circuit configured to receive data transmitted wirelessly. This third current is sensed in proximity to the source of the branch circuit and the second current is adjusted as a function of the value of the third current so that the apparatus does not cause the third current and the second current in combination to exceed the rated current capacity of the branch circuit.

In an embodiment, a plurality of inverters each receive direct current from a corresponding co-generation system and supply alternating current into a non-dedicated branch circuit. Each inverter includes a circuit for receiving the value of the current sensed in proximity to the origin of the non-dedicated branch circuit. In addition, each inverter is capable communicating to the other inverters the value of the alternating current it supplies to the branch circuit. Each inverter has means for adjusting the current it supplies to the non-dedicated branch circuit based on the values communicated from the other inverters and the value of current sensed in proximity to the origin of the non-dedicated branch circuit so that the inverters do not cause the total current on the non-dedicated branch circuit to exceed the rated current capacity of the branch circuit.

In another embodiment, one or more inverters can be adapted to communicate with a remote device, for example, a mobile phone, notebook computer, or tablet computer. The remote device communicates with the inverters and the current sensor. The remote device may display operational information for a user. The remote device may use the information communicated from the sensor to control the output of the inverters so that the output of the inverter or inverters plus the current at the location of the current sensor is less than the current capacity of the non-dedicated branch circuit.

DRAWINGS

These and other features, aspects, and advantages of the present invention will become better understood with regard to the following description, appended claims, and accompanying drawings where:

DESCRIPTION

Figure 1:
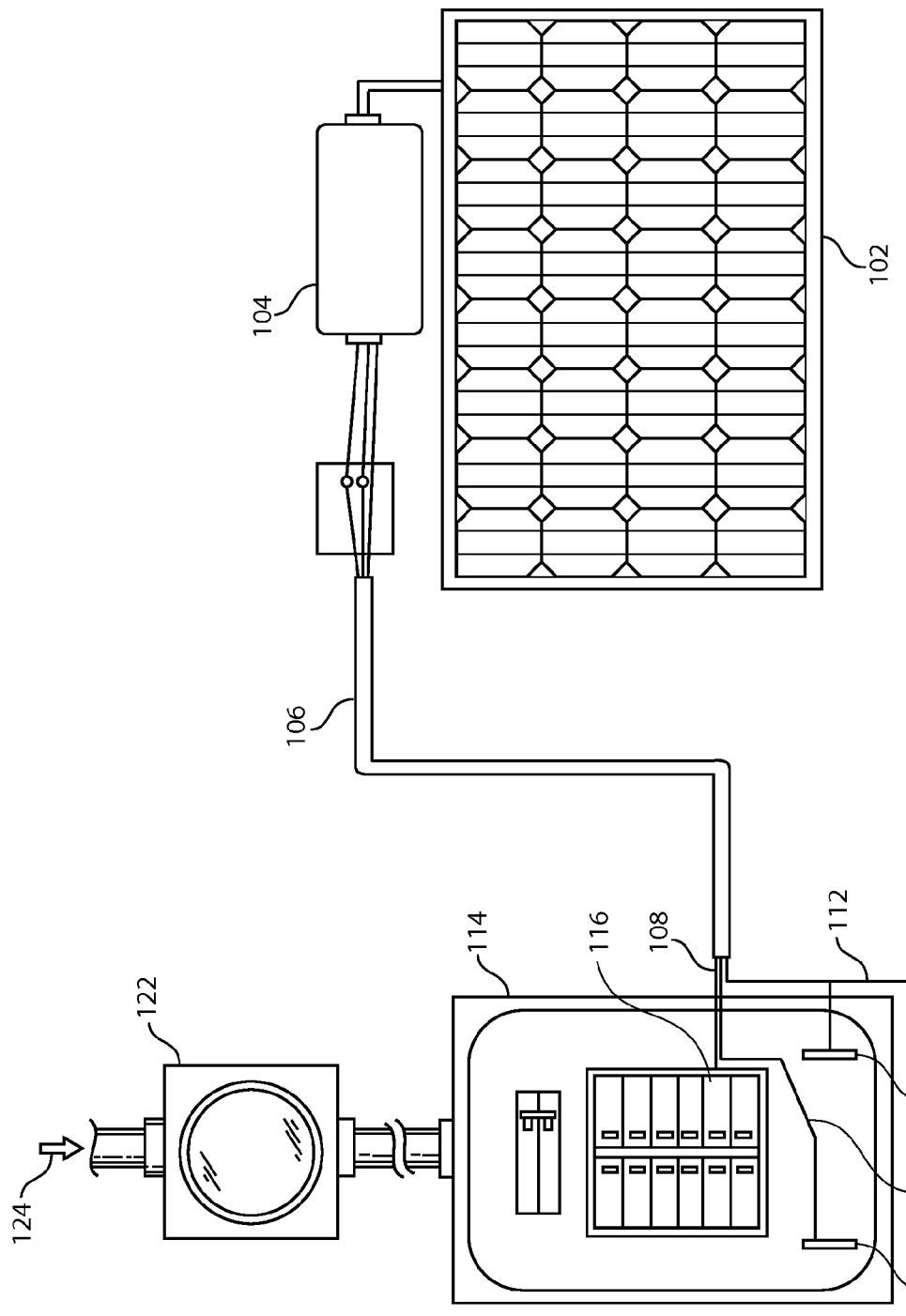
FIG. 1 illustrates a representation of a solar photovoltaic panel and inverter combination supplying power to the utility grid through a dedicated branch circuit as is typical presently in the art.

Referring now to the drawings in detail wherein like numerals indicate like elements throughout the several views, FIG. 1 illustrates a typical installation of a co-generation system connected through a dedicated branch circuit to a utility power grid in a residential setting as exists presently in the art. A solar photovoltaic panel 102 is connected to an inverter 104. As defined for this disclosure, the terms "inverter" and "DC to AC inverter" both refer to a device commonly known as a grid-tied inverter or synchronous inverter. A grid-tied inverter converts direct current (DC) from a co-generation device to alternating current (AC) and synchronizes its frequency and phase for compatibility with the power supplied from the utility grid. A sub-class of grid tied inverters includes micro-inverters. A micro-inverter converts DC to AC from a single co-generation device, for example, a single solar photovoltaic panel or wind turbine. Micro-inverters and solar photovoltaic panels are often mounted together to form a complete unit.

The inverter 104 is connected to a dedicated branch circuit 106 that includes a hot wire 108, a neutral return wire 110, and a safety ground wire 112. The dedicated branch circuit 106 terminates at a breaker box 114. The hot wire 108 connects to a circuit breaker 116, the neutral return wire 110 to a neutral bus bar 118, and the safety ground wire 112 to a ground bus bar 120. The breaker is connected in a common feed to a utility power meter 122. Utility supplied power 124 flows through the utility power meter 122.

In FIG. 1, when current from the solar photovoltaic panel 102 and the inverter 104 combination exceeds the rated current capacity of the dedicated branch circuit 106, the circuit breaker 116 "trips" and creates an open circuit so current can no-longer flow in the dedicated branch circuit 106 until the fault is corrected and the circuit breaker 116 is reset. If there is a power failure on the grid, the inverter 104 will sense the loss of line voltage from the dedicated branch circuit 106 and shut itself down so that as not to inject power when there is a fault on the grid. The system shown in FIG. 1 works well for preventing possible hazardous conditions where one or more solar photovoltaic panels, wind turbines, or other co-generation devices are tied through residential or commercial wiring to the utility grid through a dedicated branch circuit.

Figure 2:
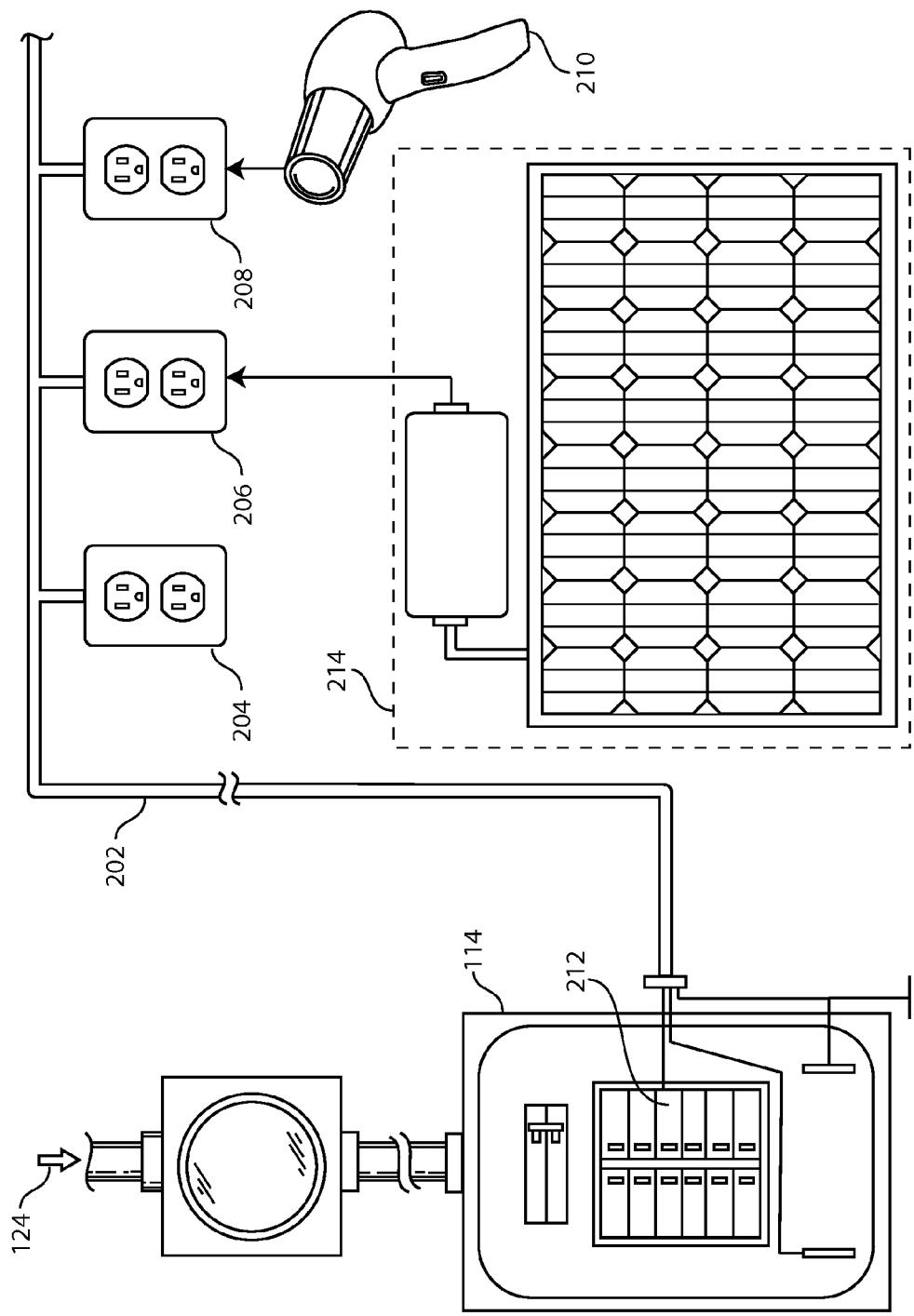
FIG. 2 illustrates a representation of a non-dedicated branch circuit connected to both a load and co-generation device demonstrating the current overload problem.

However, without the present invention, a potentially hazardous situation exists when connecting a co-generation system to a non-dedicated branch circuit with one or more loads, for example, as shown in FIG. 2. A non-dedicated branch circuit 202 is connected to a first electrical receptacle 204, a second electrical receptacle 206, and a third electrical receptacle 208. Current flows to a load 210, such as a consumer appliance, through the third electrical receptacle 208. This current can flow through the non-dedicated branch circuit 202 from both the utility supplied power 124 through a circuit breaker 212, located within the breaker box 114, and from a solar co-generation system 214 through the second electrical receptacle 206. The potentially hazardous situation can occur when the current demanded by the load 210 exceeds the rated current capacity of the non-dedicated branch circuit 202. When this occurs, it is possible that the solar co-generation system 214 could supply a large enough portion of the current to the load 210 so that the current through the circuit breaker 212 from the utility supplied power 124 is not enough to trip the circuit breaker 212 and eliminate the potential hazard.

As defined in this disclosure, a "non-dedicated branch circuit" is a utility tied circuit in a residential or commercial electrical wiring system that originates with a circuit breaker in a utility tied breaker box and terminates in a plurality of electrical receptacles or outlets. As defined in this disclosure, an "electrical receptacle" is an AC outlet, wall socket, or connection that meets national or regional jurisdictional standards for supplying electricity from a branch circuit to a consumer or commercial appliance. For example, in the United States, electrical receptacles include those designated by the National Electric Manufacturers Association (NEMA) as NEMA 5-15 and NEMA 5-20 receptacles. Those skilled in the art would recognize an electrical receptacle, as defined by this disclosure, within their jurisdiction.

Figure 3:
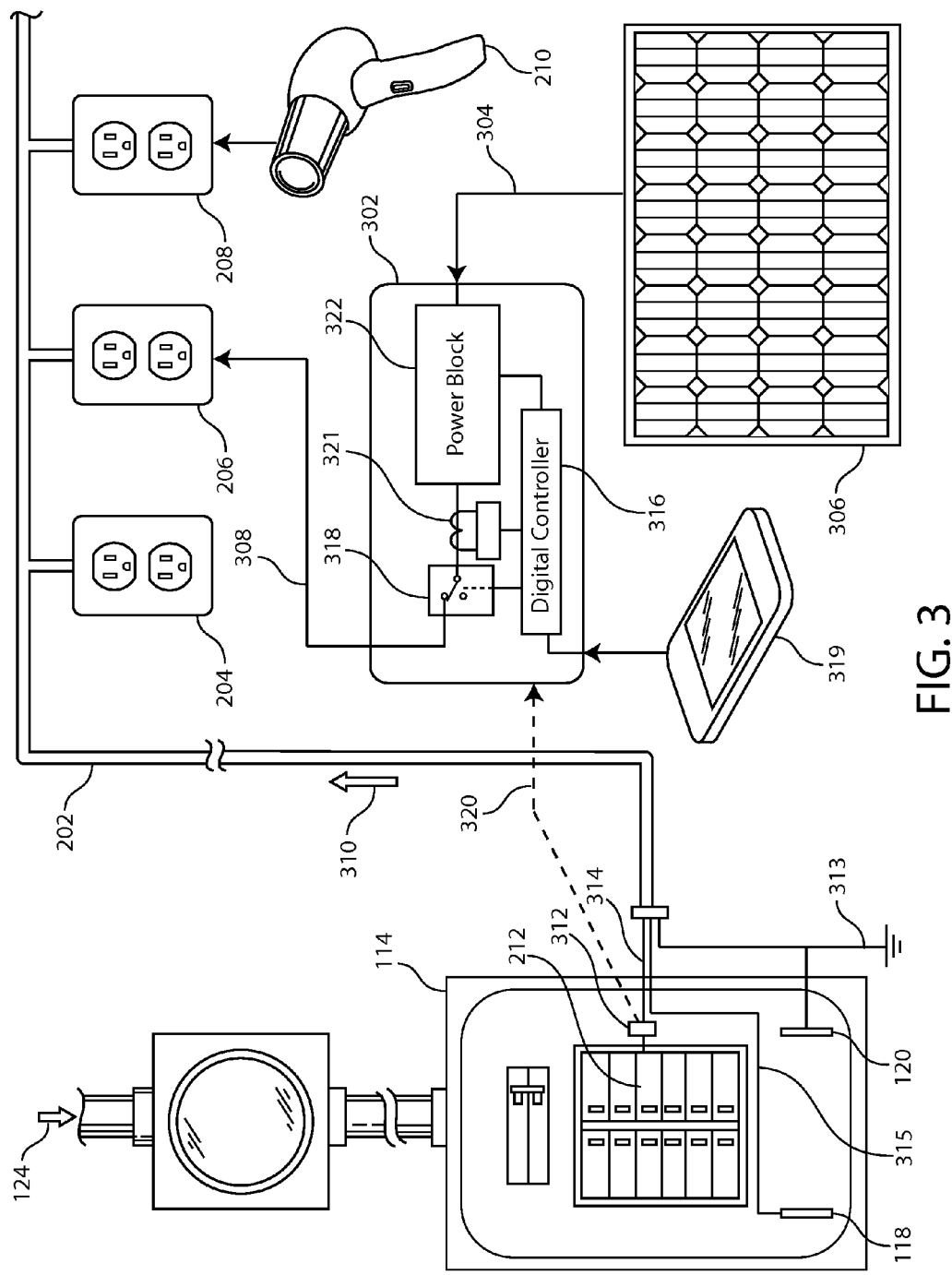
FIG. 3 illustrates an apparatus in accordance with principles of the invention, which prevents the current overload problem illustrated in FIG. 2.

FIG. 3 illustrates an apparatus, in accordance with principles of the invention, which prevents the potentially hazardous situation, illustrated in FIG. 2, and described in preceding paragraphs of this disclosure, from occurring. Referring to FIG. 3, an inverter 302 is configured to receive a first current 304 from a solar photovoltaic panel 306 and supply a second current 308 into the non-dedicated branch circuit 202 through the second electrical receptacle 206. Typically, the second current 308 would be carried from the inverter 302 to the second electrical receptacle 206 by an AC power cord with an AC safety plug adapted compatible with second electrical receptacle 206. The inverter 302 is adapted to receive information representing the value of a third current 310. The value of the third current 310 is sensed in proximity to the source of the non-dedicated branch circuit 202. In FIG. 3, a current sensor, for example, a current transformer 312 senses the value of the third current 310. The non-dedicated branch circuit 202 is a single phase circuit that includes a safety ground 313 tied the ground bus bar 120, a hot wire 314, and a neutral return wire 315 tied to the neutral bus bar 118. The current transformer 312 surrounds a hot wire 314 within the breaker box 114. The hot wire 314 is a current carrying conductor of the non-dedicated branch circuit 202. The inverter 302 is adapted to adjust the second current 308 as a function of the value of the third current 310 so that the third current 310 and the second current 308 in combination do not exceed the rated current capacity of the non-dedicated branch circuit 202. A digital controller 316 within the inverter 302, for example, can be adapted to adjust the second current 308 as a function of the value of the third current 310 so that the third current 310 and the second current 308 in combination do not exceed the rated current capacity of the non-dedicated branch circuit 202.

Under normal operation, the load 210 draws current through the third electrical receptacle 208. The load 210 may be powered from a combination of the second current 308 and the third current 310. Surplus energy available from the inverter 302 also may travel out of the non-dedicated branch circuit 202 into other branch circuits on the premises or back to the utility. When the current demand from the load 210 exceeds the rated current capacity of the non-dedicated branch circuit 202, the inverter 302 will reduce the second current 308 supplied to the non-dedicated branch circuit 202 so that inverter 302 will not cause the combination of the third current 310 and second current 308 to exceed the rated current capacity of the non-dedicated branch circuit 202. The inverter 302 will reduce the second current 308 to zero if required. As the second current decreases, the third current 310 supplied from the utility will increase to meet the demand from the load 210. When the third current 310 increases to a level where it exceeds the rated current capacity of the non-dedicated branch circuit 202, the circuit breaker 212 will trip normally. The inverter 302 no longer senses any current or voltage from the non-dedicated branch circuit 202 and takes itself off-line by signaling a disconnect circuit 318. There is no longer any current supplied to the non-dedicated branch circuit 202 by either the solar photovoltaic panel 306 or the utility thus the potentially hazardous situation is eliminated.

As defined in this disclosure, "a current sensed in proximity to the source of the non-dedicated branch circuit" means sensing a current representative of the value of current flowing through the circuit breaker located at the non-dedicated branch circuit origin. Referring again to FIG. 3, in order to ensure that the current sensed is representative of current flowing through the origin of the non-dedicated branch circuit 202 the current transformer 312 is preferably located at or near the circuit breaker 212 located with breaker box 114. However, the current transformer 312, or an equivalent current sensing device, such as a hall effect device, or series current sensing circuit, can be located at any point between the origin of the branch circuit and the location where current first branches or divides with respect to branch circuit origin, for example, the first electrical receptacle 204. Alternatively, the current transformer 312, or the equivalent current sensing device, can also be located within the circuit breaker 212, the circuit breaker 212 and current sensing device forming an integral unit.

Figure 4:
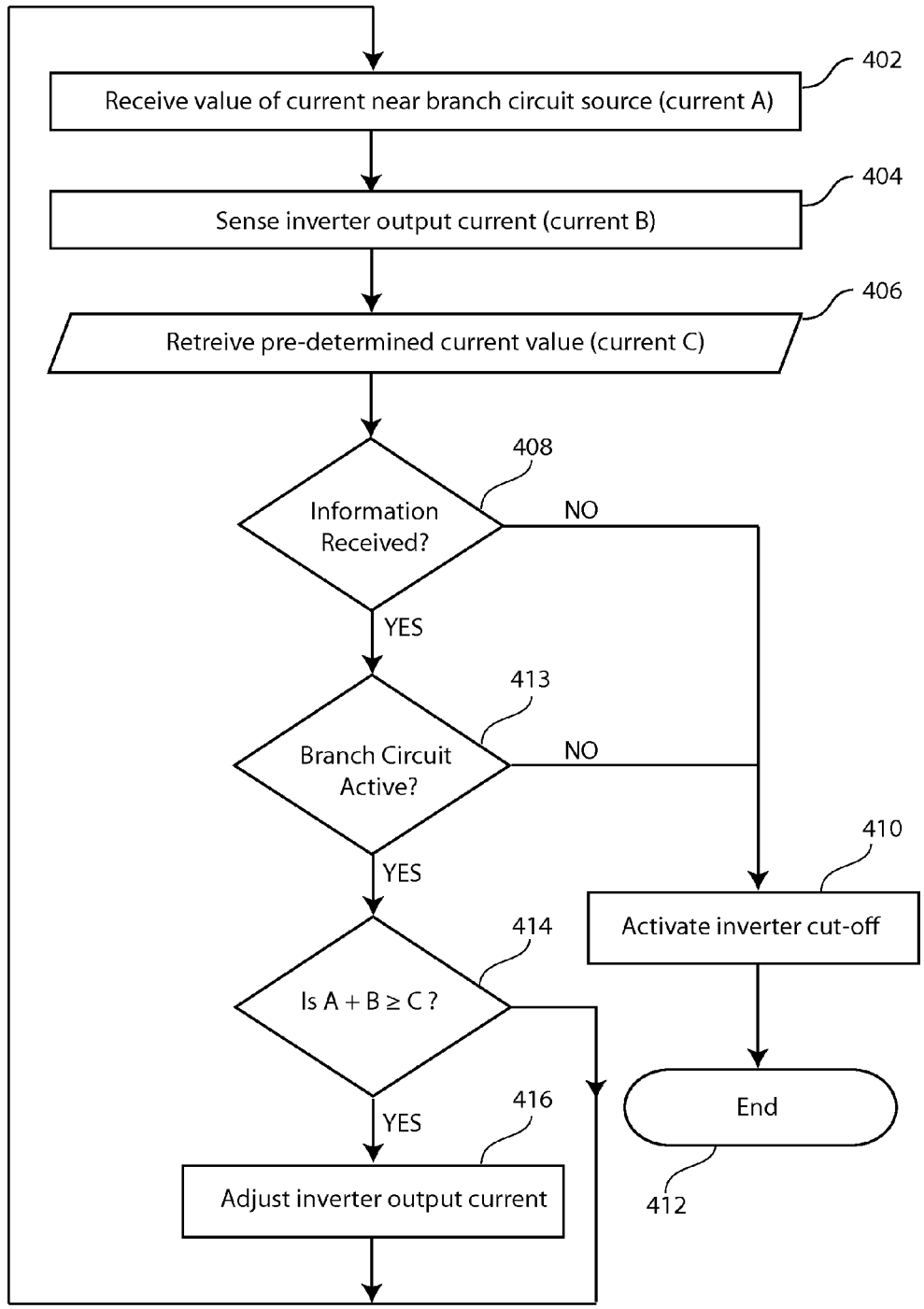
FIG. 4 illustrates a flow chart in accordance with principles of the invention.

FIG. 4 illustrates steps for adjusting the second current 308 as a function of the value of the third current 310 to ensure that the third current 310 and the second current 308 in combination do not exceed the rated current capacity of the branch circuit. Referring to FIG. 3 and FIG. 4, in step 402 a digital controller 316 within the inverter 302 receives the value of the branch current sensed in proximity to its source. The digital controller 316 receives the information that includes the value from the current transformer 312. In step 404 the digital controller 316 senses output current of the inverter 302. In step 406, the digital controller 316 retrieves a preset current value stored in memory. This preset value represents a percentage of the rated current capacity of the branch circuit, typically, 80% to 100% of the rated current capacity of the branch circuit. Other values are possible and can be adapted to meet local jurisdictional requirements.

In step 408, if the information was not received by the digital controller 316 from the current transformer 312 in step 402, then in step 410, a disconnect circuit 318 is activated by the digital controller 316 in order to stop the second current 308 from flowing into the non-dedicated branch circuit 202 and the process terminates in step 412. If the information is received from the current transformer 312, then in step 413, the digital controller 316 checks for the presence of an active branch circuit. This can be tested in manner known to those skilled in the art using "anti-islanding" circuitry within the inverter 302. If the branch circuit is not active then in step 410, the disconnect circuit 318 is activated so that the second current 308 is prevented from flowing from the inverter 302 to the non-dedicated branch circuit 202 and the process is terminated in step 412. If the branch circuit is active, then in step 414, the digital controller 316 adds the two current values and compares them the preset value stored in memory. If the sum of the two current values exceeds the preset value, then in step 416, the inverter 302 reduces its output current and the process loops back to the beginning. If the sum of the value of the two currents does not exceed the preset value, then the process loops back to the beginning.

The preset value may be loaded into the inverter 302 by an external processing device 319, for example, a mobile phone, computer, or electronic tablet. It may be loaded by wire, for example, USB or Ethernet protocols. Alternatively, the preset value may be loaded wirelessly, for example, by 802.11 for 3G protocols.

Figure 5A:
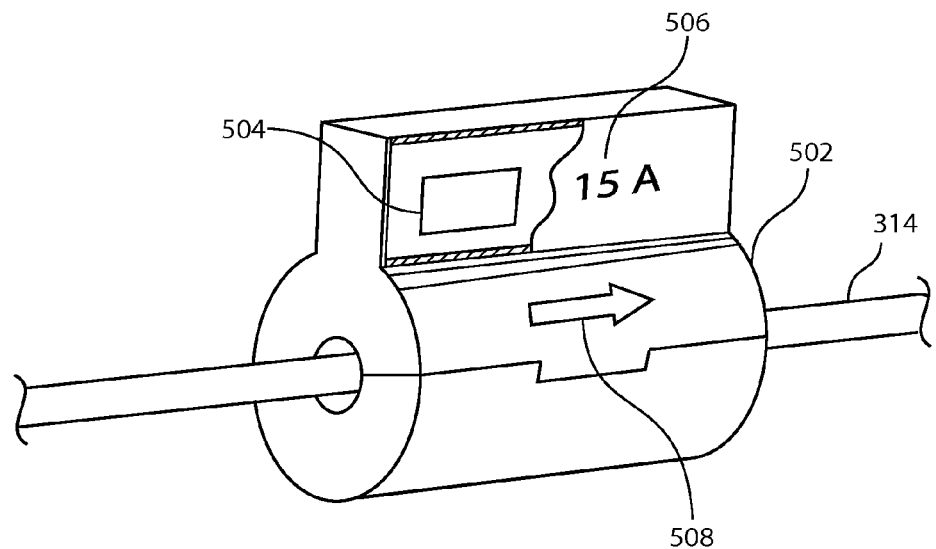
FIG. 5A illustrates an embodiment of a current transformer in accordance with principles of the invention showing a partial cutaway view of the current transformer outer surface.

Alternatively, the current transformer 312 can establish the preset value. For example, the current transformer 312 can be designed for a fixed branch circuit capacity. Referring to FIG. 5A, a current transformer 502 is designed to be placed on a 15 Ampere branch circuit hot wire. The internal memory 504 of the current transformer 502, revealed by a partial cutaway view of the current transformer surface, stores this data representing the preset value. In addition an indicia 506 indicates the designated current value to the contractor or installer and the direction to place the current transformer 502 relative to the branch circuit. In an embodiment, the current transformer 502 is placed on hot wire 314. In FIG. 5A the direction of an arrow indicia 508 is toward the branch and away from the branch origin.

Figure 5B:
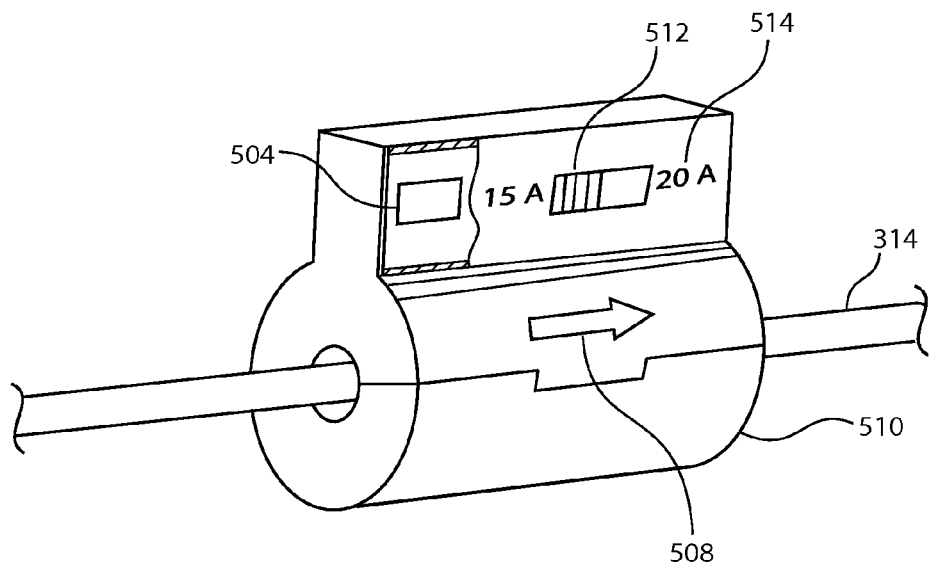
FIG. 5B illustrates an alternative embodiment of a current transformer in accordance with principles of the invention showing a partial cutaway view of the transformer outer surface.

Referring to FIG. 5B in an alternative embodiment, the current transformer 510 has a selector switch 512 with indicia 514 for the user to select the preset value of current programmed into the internal memory 504 of the current transformer 510. The internal memory 504 is revealed by a partial cutaway view of the current transformer 510 outer surface. Referring to FIG. 5B and FIG. 3, the value stored in the internal memory 504 is transmitted to the digital controller 316 by wireless communication 320. In alternative embodiments, the value can be transmitted through the power line by modulating a signal on the branch circuit, or by wire through RS-485 or other serial digital protocol.

Referring again to FIG. 3, the inverter 302 includes an internal current sensor 321 and a power block 322. The power block 322 includes DC to AC inverter circuit, a maximum power point tracker (MPPT) circuit, and a DC-to-DC boost circuit. The digital controller 316 communicates with the power block 322 in order to adjust the second current 308.

In an embodiment, the digital controller 316 adjusts the MPPT circuit within the power block 322 in order to adjust the second current 308 so that the inverter does not cause the sum of the second current 308 and third current 310 to exceed the rated current capacity of the branch circuit. Under normal operation, a MPPT circuit is designed to allow a solar photovoltaic panel to operate at a voltage and current combination that extracts the maximum or optimal power from the photovoltaic panel at any given point in time. In accordance with principles of the invention, the MPPT circuit of the power block 322 can be taken out of normal operation mode whenever the digital controller 316 detects that the sum of the values of the second current 308 and the third current 310 exceed the preset amount. In this instance, the MPPT circuit, instead of optimizing the power out from the solar photovoltaic panel 306 that the inverter 302 receives, the MPPT adjusts the second current 308 so that the inverter does not cause the sum of the second current 308 and third current 310 to exceed the rated current capacity of the branch circuit.

In an embodiment the MPPT circuit within the power block 322 dynamically adjusts the load impedance presented to first current 304 in order to adjust the second current 308 so that the sum of the second current 308 and third current 310 do not exceed the rated current capacity of the branch circuit.

Alternatively, a circuit, other than an MPPT circuit, can be adapted to adjust the load impedance presented to first current 304 in order to adjust the second current 308 to ensure that the sum of the second current 308 and third current 310 do not exceed the rated current capacity of the branch circuit. For example, a DC-to-DC boost circuit could be used to adjust the load presented to the first current 304 and adjust the second current 308 to ensure that the inverter does not cause the sum of the second current 308 and third current 310 to exceed the rated current capacity of the branch circuit.

Figure 6:
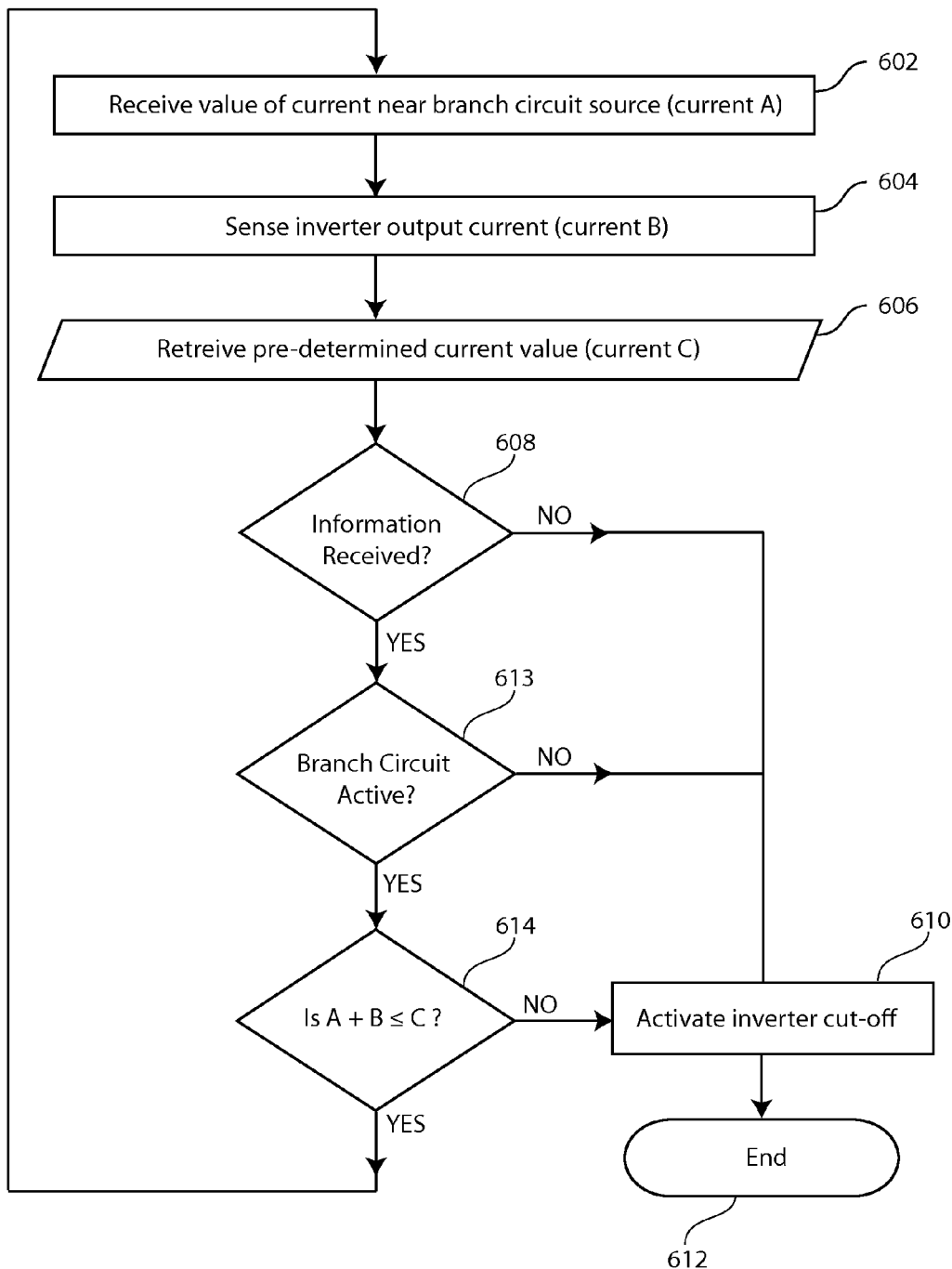
FIG. 6 illustrates a flow chart, in an alternative embodiment, in accordance with principles of the invention.

In an alternate embodiment, the digital controller 316 adjusts the disconnect circuit 318 in order to adjust the second current 308 so that the inverter does not cause the sum of the second current 308 and third current 310 to exceed the rated current capacity of the branch circuit. Referring to FIG. 6 and FIG. 3, FIG. 6 illustrates, steps for adjusting the second current 308 as a function of the value of the third current 310 so that the third current 310 and the second current 308 in combination do not exceed the rated current capacity of the branch circuit. In step 602, the digital controller 316 receives the value of the current of the non-dedicated branch circuit in proximity to its source from information the digital controller 316 receives from the current transformer 312. In step 604 the current sensor 321 within the inverter 302 senses the output current of the inverter 302. In step 606, the digital controller 316 retrieves a preset current value stored in memory. The preset value represents a percentage of the rated current capacity of the branch circuit, typically, 80% to 100% of the rated current capacity of the branch circuit.

In step 608, if the information was not received by the digital controller 316 from the current transformer 312 in step 602, then in step 610, the disconnect circuit 318 is activated by the digital controller 316 in order to stop the second current 308 from flowing into the non-dedicated branch circuit 202. The process then terminates in step 612. If the information is received from the current transformer 312, then in step 613, the digital controller 316 checks for the presence of an active branch circuit. This can be tested in manner known to those skilled in the art using "anti-islanding" circuitry within the inverter 302. If branch circuit is not active then in step 610, the disconnect circuit 318 is activated so that the second current 308 is prevented from flowing from the inverter 302 to the non-dedicated branch circuit 202 and the process is terminated in step 612. If the branch circuit is active, then in step 614, the digital controller 316 adds the two current values and compares them the preset value stored in memory. If the sum of the two current values exceeds the preset value, then in step 610, the inverter cut-off sequence is again activated by activating the disconnect circuit 318 and step 612 terminating the process. If the sum of the value of the two currents does not exceed the preset value, then the process loops back to the beginning Once the disconnect circuit 318 is activated, the load 210 will be supplied entirely by the utility supplied power 124 through the circuit breaker 212. The circuit breaker 212 will trip normally if the power through the circuit breaker 212 exceeds the branch circuit rated current capacity. With no current flowing through the non-dedicated branch circuit 202, the potential hazard is removed.

The digital controller 316 can include a microprocessor, microcontroller, digital signal processor, or programmable logic device, alone or in combination. In addition, the digital controller 316 can include peripheral processing devices, for example, analog-to-digital, digital-to-analog converters, wireless transceivers, or digital transceivers, either internal or external to a microprocessor, microcontroller, digital signal processor, or programmable logic device.

The digital controller 316 is adapted to receive information that includes the value of the third current 310. This can be facilitated through wireless communication 320 between the inverter 302 and the current transformer 312 using wireless protocol standards known to those skilled in the art, for example, 802.11 or Zigbee.

Figure 7:
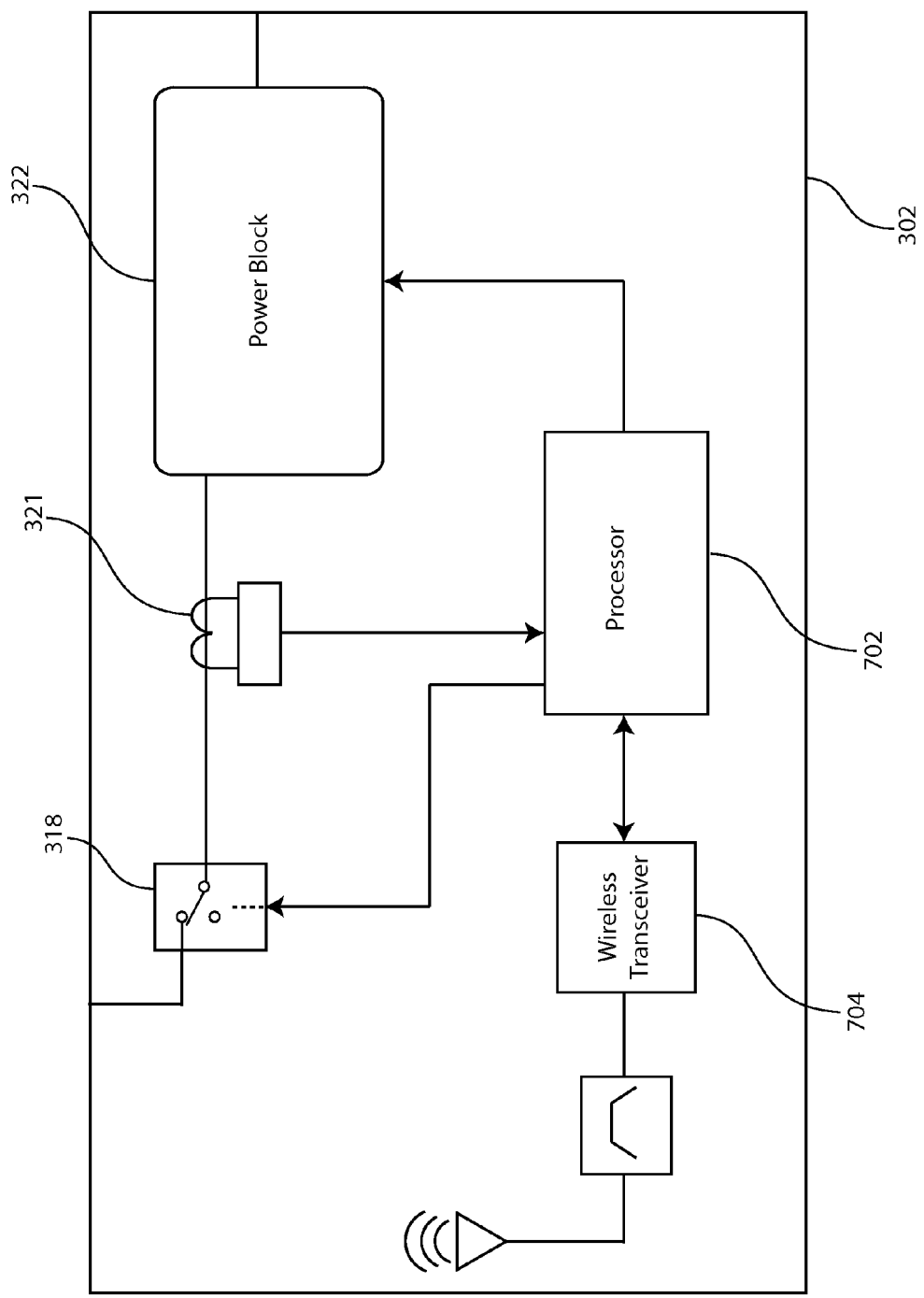
FIG. 7 illustrates an apparatus in accordance with principles of the invention adapted to receive wireless communication that includes the value of current sensed in proximity to the origin of the non-dedicated branch circuit.

The digital controller 316 can be adapted to receive the wireless communication 320 directly. Referring to FIG. 7 and FIG. 3, a processor 702 within the inverter 302 is adapted to receive the wireless communication through a wireless transceiver 704. The wireless communication originates at the current transformer 312 or equivalent current sensing device adapted to sense current flowing through the non-dedicated branch circuit 202 in proximity to the source of the non-dedicated branch circuit 202. The processor 702 is adapted to receive the value of the second current 308. The value of the second current 308 is sensed within the inverter 302 by the current sensor 321. While in FIG. 7, the processor 702 is adapted to control the power block 322 and the disconnect circuit 318, those skilled in the art will recognize that a separate processor can be used for these functions and a dedicated wireless controller can be used to receive the wireless communication.

The digital controller 316 can be adapted to receive the value of the third current 310 through non-wireless communication. For example, the digital controller 316 can be adapted to receive information that includes the value of the third current 310 by modulating a signal on the branch circuit. This may be facilitating by using a standard communication protocol, for example, HomePlug Green, universal power bus (UPB), or X10. Alternatively pulse-position modulation (PPM), ripple carrier signaling, or any scheme capable of transmitting low bandwidth, narrow-band communication for transmitting information over a residential branch circuit could be used.

Figure 8:
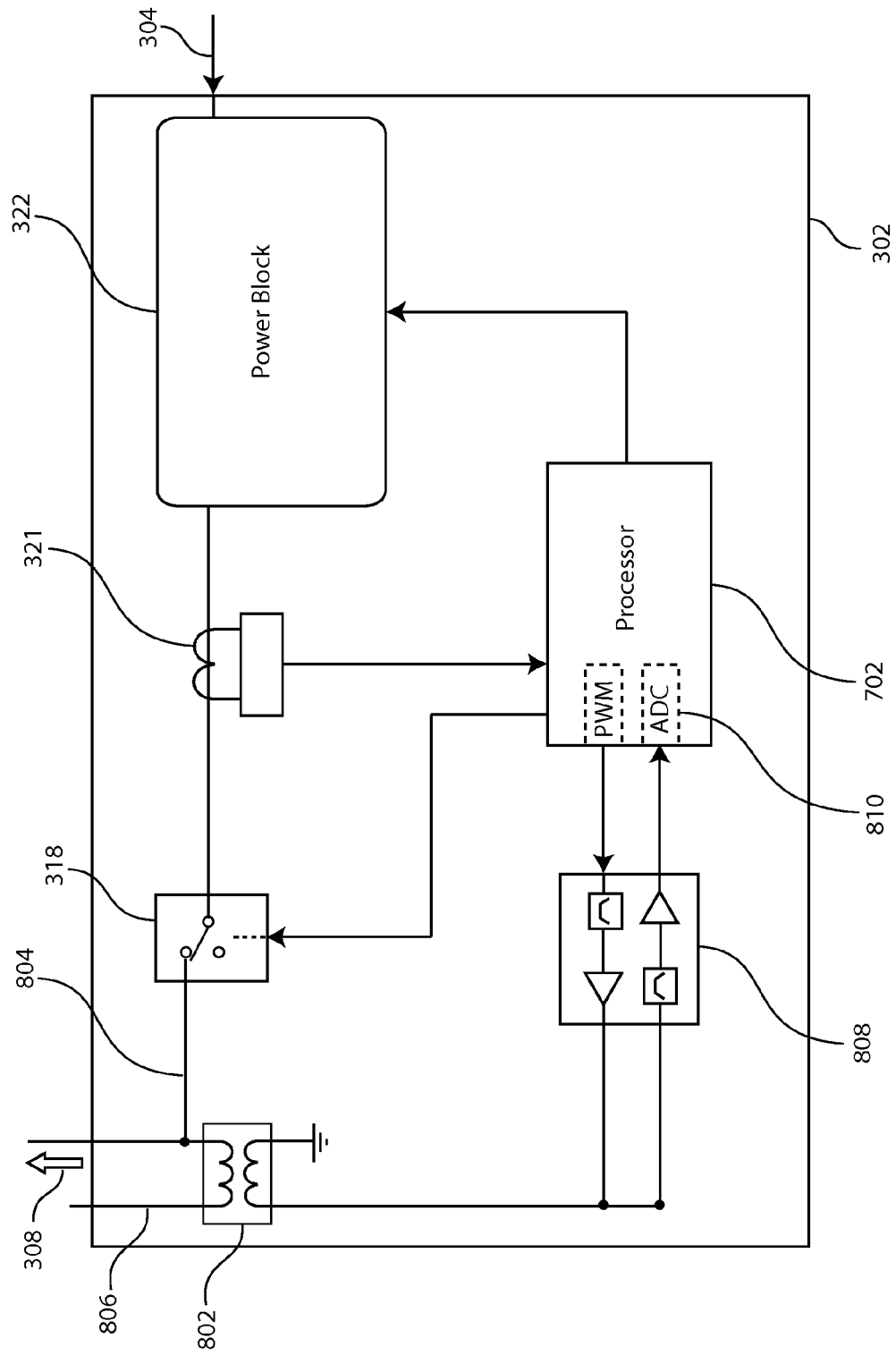
FIG. 8 illustrates an alternative embodiment of an apparatus in accordance with principles of the invention adapted to receive communication through the non-dedicated branch circuit, the communication including the value of current sensed in proximity to the origin of the non-dedicated branch circuit.

Referring to FIG. 8 and FIG. 3, the processor 702 is adapted to receive the value of the third current 310 from the non-dedicated branch circuit 202 through the second electrical receptacle 206. The current transformer 312, or equivalent device, adapted to sense current, transmits the information onto the non-dedicated branch circuit 202 by modulating a signal on the non-dedicated branch circuit 202 using either HomePlug Green, universal power bus (UPB), X10, pulse-position modulation (PPM), ripple carrier signaling, or any scheme capable of transmitting low bandwidth, narrow-band communication for transmitting information over a residential branch circuit. The processor 702 can be adapted to receive the value of the third current 310 using one of these protocols. An isolation transformer 802 is connected to a hot wire 804 and a neutral wire 806 within the inverter 302 that is adapted to supply the second current 308 to the non-dedicated branch circuit 202. The second current 308 supplies the non-dedicated branch circuit 202 through the second electrical receptacle 206 as previously described. The isolation transformer 802 reduces the voltage to a level suitable for signal processing. An analog front end 808 filters out the power-line frequencies, typically 60 Hz. or 50 Hz, depending on the jurisdiction. An analog-to-digital converter 810 within the processor 702 receives the resulting signal that includes the value of the third current 310. The processor 702 is shown in relation to the power block 322 adapted to receive the first current 304 and output the second current 308, the current sensor 321 for sensing the second current 308, and the disconnect circuit 318.

While FIG. 8 illustrates a circuit topology for receiving information over a residential branch circuit using a transformer; those skilled in the art will recognize that transformerless circuit configurations are also possible. While, FIG. 8 illustrates the analog front end 808 external to the processor 702 and an analog-to-digital converter 810 within the processor 702, it is also possible to externalize both circuits from the processor 702. Alternatively, a dedicated controller specifically designed for power-line communications could be used. Those skilled in the art will recognize other circuit configurations for receiving information over a residential branch circuit.

It may be desirable for the digital controller 316 to be adapted to receive information that includes the value of the third current 310 through by means of a physical connection or wired communication. Wired communication can include a serial digital communication protocol, for example, RS-232, or RS485. Wired communication can also include digital network protocols, for example, Ethernet, or can include other digital communications standards, for example, USB, or FireWire. Wired communication can also include communicating an analog voltage to represent value of the sensed current.

Figure 9:
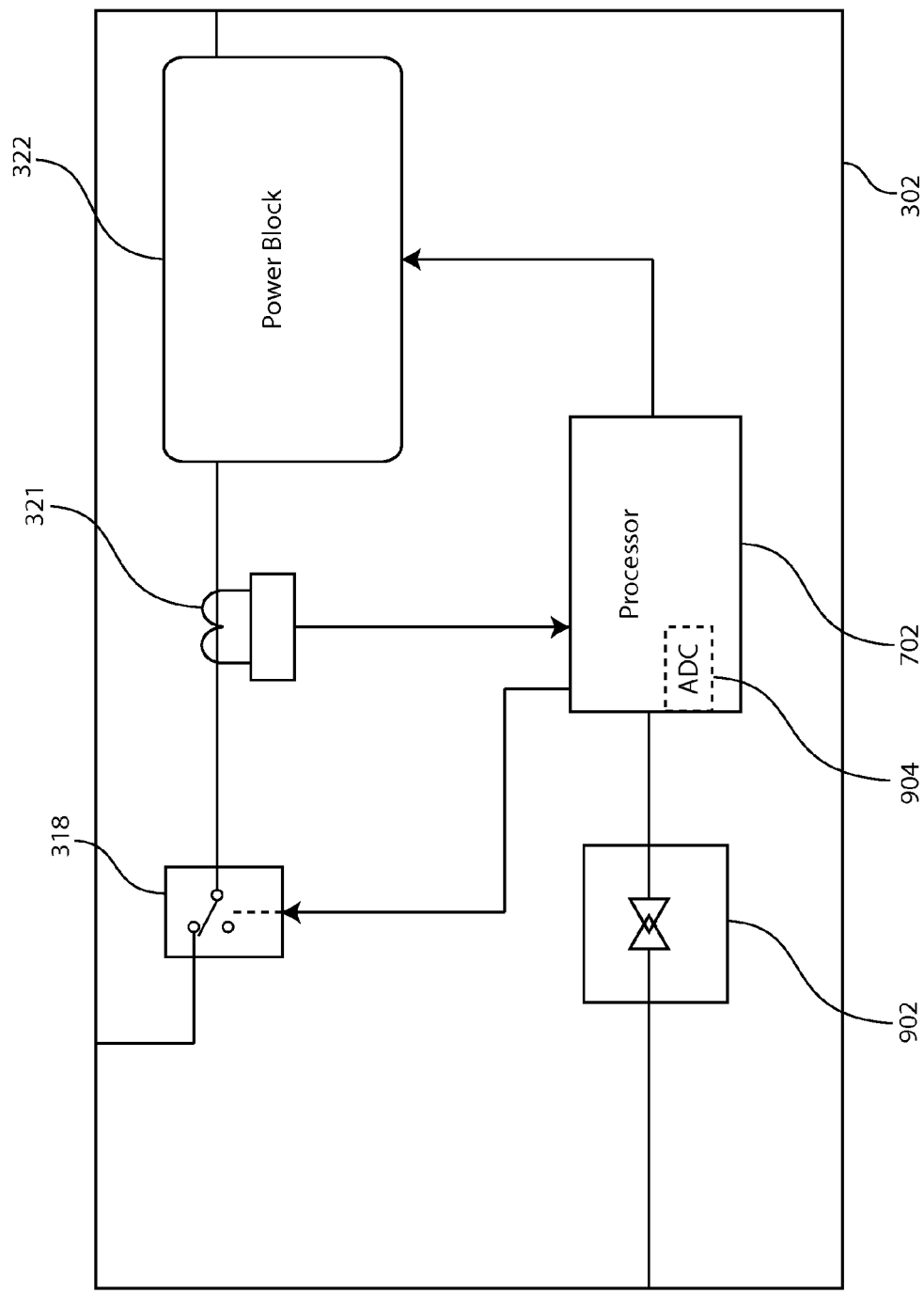
FIG. 9 illustrates an alternative embodiment of an apparatus in accordance with principles of the invention adapted to receive communication through wired communication that includes the value of current sensed in proximity to the origin of the non-dedicated branch circuit.

Referring to FIG. 3 and FIG. 9, the current transformer 312 has an output that includes information representing the current sensed in proximity to the origin of the branch circuit communicated by wire to the inverter 302. The processor 702 receives the signal that includes the information representing the current sensed in proximity to the origin of the non-dedicated branch circuit 202 through a transceiver 902. The current transformer 312 transmits the information digitally through a serial digital communication protocol, for example, RS-485. In FIG. 9, the transceiver 902 is separate from the processor 702. Alternatively, the transceiver 902 can be integrated into the processor 702. In an alternative embodiment, the current transformer 312 outputs an analog voltage that is proportional to the value of the third current 310. Processor 702 is adapted to receive this analog voltage through a port that includes an analog-to-digital converter 904. The processor 702 and transceiver 902 are shown in relation to the power block 322, the current sensor 321 for sensing the second current 308, and the disconnect circuit 318 within the inverter 302.

Figure 10:
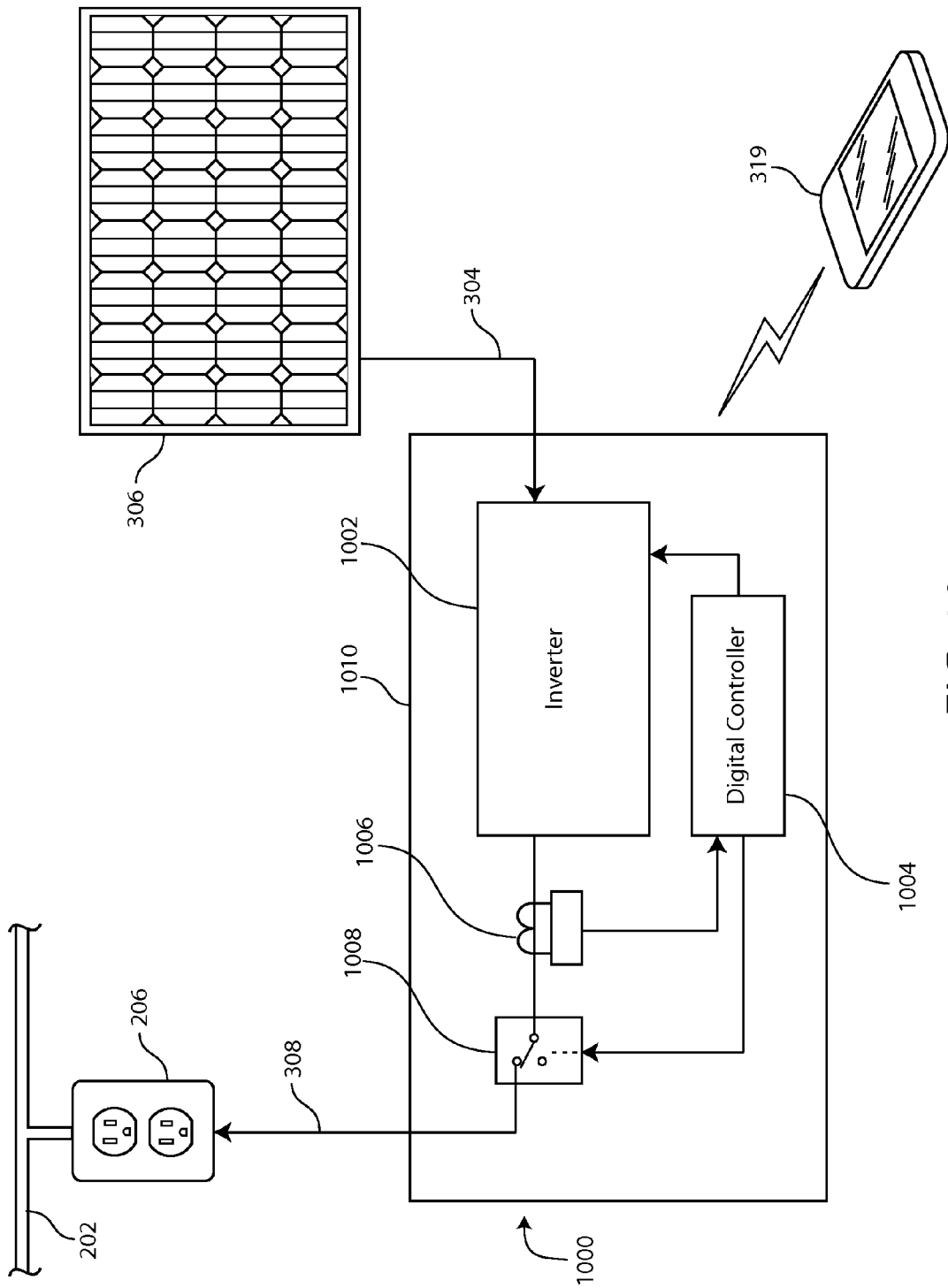
FIG. 10 illustrates an alternative embodiment of an apparatus in accordance with principles of the invention.

FIG. 10 illustrates an alternative embodiment of an apparatus 1000 in accordance with principles of the invention. Referring to FIG. 10 and FIG. 3, an inverter 1002, a digital controller 1004, a current sensor 1006, and a disconnect circuit 1008 are protected by an enclosure 1010. The inverter 1002 receives the first current 304 from the solar photovoltaic panel 306 and supplies the second current 308 to the non-dedicated branch circuit 202 through the second electrical receptacle 206. The digital controller 1004 is adapted to receive information representing the value of the third current 310. The value of the third current 310 is sensed in proximity to the source of the non-dedicated branch circuit 202 as previously described in this disclosure. The apparatus 1000 includes means for adjusting the second current 308 as a function of the value of the third current 310 so that the third current 310 and the second current 308 in combination do not exceed the rated current capacity of the non-dedicated branch circuit 202.

Referring to FIG. 3, FIG. 4, and FIG. 10, in step 402, the digital controller 1004 receives the value of the branch current in proximity to its source from information received from the current transformer 312. In step 404, the current sensor 1006 or equivalent current sensing device sense the second current 308 from the output of the inverter 1002 and communicates this value to the digital controller 1004. In step 406, the digital controller 1004 retrieves a preset current value stored in memory. The preset value for example, can be the rated current capacity of the branch circuit. The preset value, for example, can represent a percentage of the rated current capacity of the branch circuit, for example, 80% to 100% of the rated current capacity of the branch circuit. Other values are possible and can be adapted to meet local jurisdictional requirements.

In step 408, if the information was not received by the digital controller 1004 from the current transformer 312 in step 402, then in step 410, the disconnect circuit 1008 is activated by the digital controller 1004 in order to stop the second current 308 from flowing into the non-dedicated branch circuit 202 and the process is terminated in step 412. If the information is received from the current transformer 312, then in step 413, the digital controller 1004 checks for the presence of an active branch circuit. This can be tested in manner known to those skilled in the art using "anti-islanding" circuitry within the inverter 1002. If branch circuit is not active then in step 410, the disconnect circuit 1008 is activated so that the second current 308 is prevented from flowing from the apparatus 1000 to the non-dedicated branch circuit 202 and the process is terminated in step 412. Alternatively, step 413 can be completely under the control of the inverter 1002 rather than the digital controller 1004 and the inverter 1002 can automatically shut itself off when grid power is absent from the non-dedicated branch circuit 202. If the branch circuit is active, then in step 414, the digital controller 1004 adds the two current values and compares them to the preset value stored in memory. If the sum of the two current values exceeds the preset value, then in step 416, the inverter 1002 reduces its output current and the process loops back to the beginning. If the sum of the value of the two currents does not exceed the preset value, then the process loops back to the beginning.

The preset value may be loaded into the inverter 1002 by an external processing device 319, for example, a mobile phone, computer, or electronic tablet. It may be loaded by wired communication, for example USB, or wirelessly, for example, 802.11, Ethernet, or 3G protocols. Alternatively, the current transformer 312 can set the preset value, as previously described.

Referring to FIG. 3 and FIG. 10, the inverter 1002, in an embodiment, contains an MPPT circuit. Under normal operation, the MPPT circuit is designed to allow a solar photovoltaic panel to operate at a voltage and current combination that extracts the maximum or optimal power from the solar photovoltaic panel 306 at any given point in time. The digital controller 1004 communicates with the inverter 1002 and takes the MPPT circuit out of normal operation mode whenever it detects that the sum of the second current 308 and third current 310 exceed the preset amount. In this instance, the MPPT instead of optimizing the power output from the solar photovoltaic panel 306 that the inverter 1002 receives, the MPPT adjusts the second current 308 so that the apparatus 1000 does not cause the sum of the second current 308 and third current 310 to exceed the rated current capacity of the branch circuit. The MPPT circuit within the inverter 1002 dynamically adjusts the load impedance presented to first current 304 in order to adjust the second current 308 so that the apparatus 1000 does not cause the sum of the second current 308 and third current 310 to exceed the rated current capacity of the branch circuit.

In an alternative embodiment, the digital controller 1004 communicates with a circuit, other than an MPPT circuit, adapted to adjust the load impedance presented to first current 304 in order to adjust the second current 308 so that the apparatus 1000 does not cause the sum of the second current 308 and third current 310 to exceed the rated current capacity of the branch circuit. For example, a DC-to-DC boost circuit could be used to adjust the load presented to the first current 304 and adjust the second current 308 so that the sum of the second current 308 and third current 310 do not exceed the rated current capacity of the branch circuit.

Alternatively, the digital controller 1004 can use the disconnect circuit 1008 located outside the inverter 1002 in order to adjust the second current 308 so that the apparatus 1000 does not cause the sum of the second current 308 and third current 310 to exceed the rated current capacity of the branch circuit. For example, the digital controller 1004 activates the disconnect circuit 1008 in accordance with steps previously described and illustrated in FIG. 6.

The digital controller 1004 can include a microprocessor, microcontroller, digital signal processor, or programmable logic device, alone or in combination. In addition, the digital controller 1004 can include peripheral processing devices, for example, analog-to-digital, digital-to-analog converters, wireless transceivers, or digital transceivers, either internal or external to a microprocessor, microcontroller, digital signal processor, or programmable logic device.

The digital controller 1004 is adapted to receive information that includes the value of the third current 310. This can be facilitated by wireless communication between the digital controller 1004 and the current transformer 312 using wireless protocol standards known to those skilled in the art, for example, 802.11 or Zigbee. It can also be facilitated, in an alternative embodiment, by modulating a signal on the non-dedicated branch circuit 202 using a standard communication protocol, for example, HomePlug Green, universal power bus (UPB), or X10. Alternatively it can be facilitated by modulating a signal on the non-dedicated branch circuit 202 using a pulse-position modulation (PPM), ripple carrier signaling, or any scheme capable of transmitting low bandwidth, narrow-band communication for transmitting information over a residential branch circuit. The communication can also be facilitated by wired transmission, for example, RS-232, RS-485, and analog DC voltage. Means for receiving information representing the value of the third current 310 facilitated through wireless, modulating the power transmission on the non-dedicated branch circuit 202, and by wired transmission have been described previously in this disclosure and illustrated in FIG. 7, FIG. 8, and FIG. 9.

Figure 11:
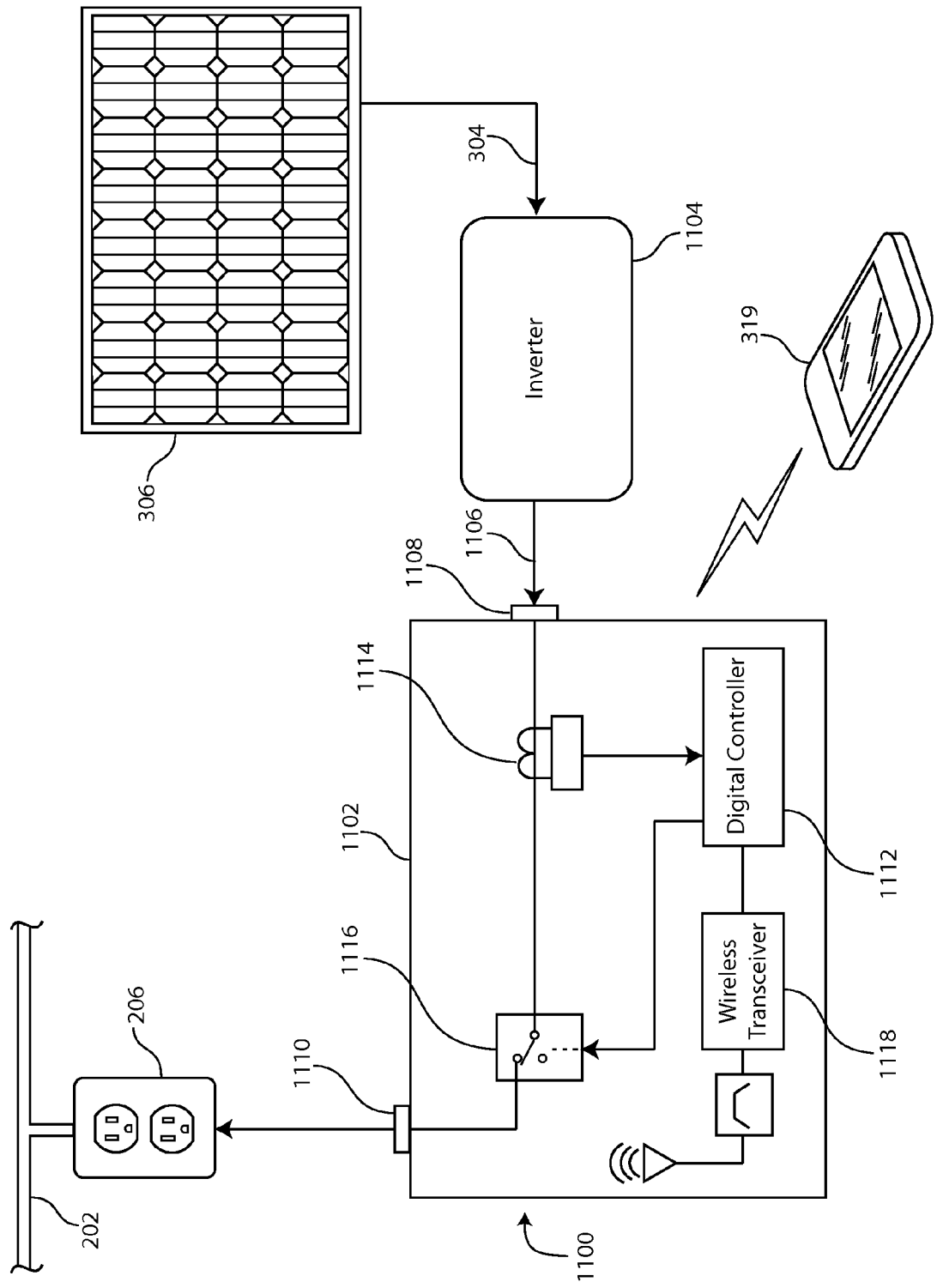
FIG. 11 illustrates an embodiment of an apparatus in accordance with principles of the invention where the apparatus is in a separate enclosure from the inverter.

FIG. 11 illustrates an embodiment of an apparatus 1100 in accordance with principles of the invention where the apparatus 1100 is in a separate enclosure 1102 from an inverter 1104 and co-generation device. The inverter 1104 receives the first current 304, which is a DC current, from a solar photovoltaic panel 306 and generates an AC current 1106 and AC voltage compatible with the non-dedicated branch circuit 202. The apparatus 1100 is adapted to receive the AC current 1106 from the inverter 1104. In an embodiment, the apparatus 1100 has a built-in NEMA-5 or IEC-320 AC equipment inlet 1108 adapted to receive the AC current 1106 from the inverter 1104. Under normal operation, the apparatus 1100 allows the AC current 1106 to flow directly through the AC equipment inlet 1108 to an AC equipment outlet 1110 into the non-dedicated branch circuit 202 through the second electrical receptacle 206.

The apparatus 1100 includes a digital controller 1112, a current sensor 1114, and a disconnect circuit 1116. The digital controller 1112 can include a microprocessor, microcontroller, digital signal processor, or programmable logic device, alone or in combination. In addition, the digital controller 1112 can include peripheral processing devices, for example, analog-to-digital, digital-to-analog converters, wireless transceivers, or digital transceivers, either internal or external to a microprocessor, microcontroller, digital signal processor, or programmable logic device.

The current sensor 1114 is adapted to sense the AC current 1106 passing through the apparatus 1100 to the non-dedicated branch circuit 202. The current sensor 1114 can be a current transformer, a current probe, or any device adapted to sense AC current. The disconnect circuit 1116 can include a relay, breaker, or other similar device adapted to disconnect AC power based on the presence or absence of a control signal. The disconnect circuit 1116 may also include circuitry adapted to taper off the current at a predetermined rate.

Referring to FIG. 3 and FIG. 11, the digital controller 1112 is adapted to receive information representing the value of the third current 310. The value of the third current 310 is sensed in proximity to the source of the non-dedicated branch circuit 202 as previously described. The apparatus 1100 includes means for stopping the flow of the AC current 1106 when the value of the sum of the third current 310 and AC current 1106 exceeds a preset value so that the sum of the third current 310 and the AC current 1106 in combination does not exceed the rated current capacity of the non-dedicated branch circuit 202.

Figure 12:
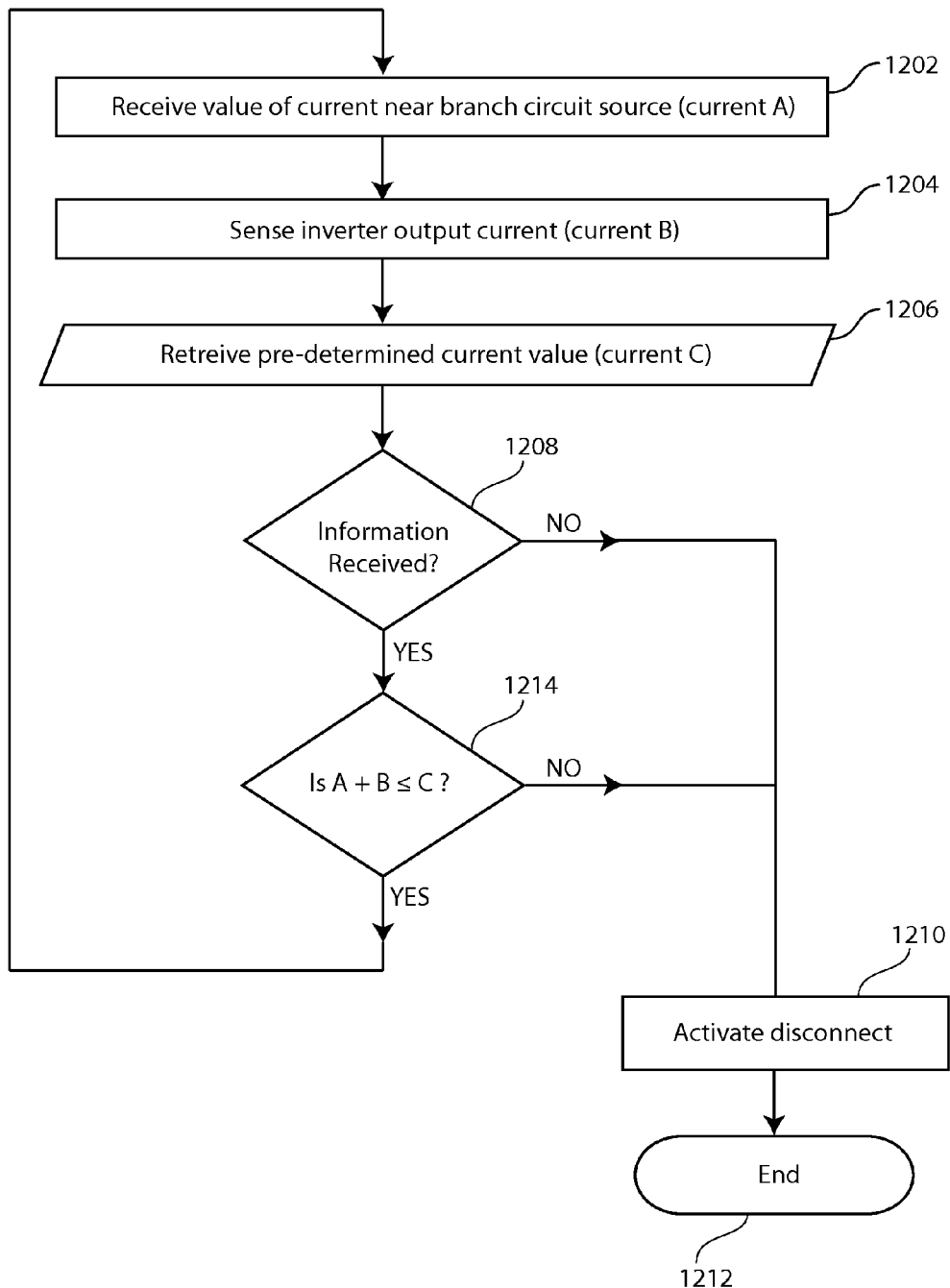
FIG. 12 illustrates a flow chart in accordance with the principles of the invention that can be applied the embodiment of to FIG. 11.

Referring to FIG. 3, FIG. 12, and FIG. 11, in step 1202, the digital controller 316 receives the value of the current branch in proximity to its source from information the digital controller 1112 receives from the current transformer 312. In step 1204 the current sensor 1114 within the apparatus 1100 senses the AC current 1106 from the inverter 1104. In step 1206, the digital controller 1112 retrieves a preset current value stored in memory. The preset value represents a percentage of the rated current capacity of the branch circuit, typically, 80% to 100% of the rated current capacity of the branch circuit. Other values are possible and can be adapted to meet local jurisdictional requirements.

In step 1208, if the information was not received by the digital controller 1112 from the current transformer 312 in step 1202, then in step 1210, the disconnect circuit 1116 is activated by the digital controller 1112 in order to stop the AC current 1106 from the inverter 1104 from flowing into the non-dedicated branch circuit 202 and the process is terminated in step 1212. In step 1208, if the information is received from the current transformer 312 in step 1202, then in step 1214, the digital controller 1112 adds the two current values and compares them the preset value stored in memory. If the sum of the two current values exceeds the preset value, then the disconnect circuit 1116 is activated in step 1210 and in step 1212, the process is terminated. If the sum of the value of the two currents does not exceed the preset value, then the process loops back to the beginning. Once the disconnect circuit 1116 is activated, the load 210 will be supplied entirely by the utility supplied power 124 through the circuit breaker 212. The circuit breaker 212 will trip normally if the power through the circuit breaker 212 exceeds the branch circuit rated current capacity. With no current flowing through the non-dedicated branch circuit 202, the potential hazard is removed.

The preset value may be loaded into the digital controller 1112 by an external processing device 319, for example, a mobile phone, computer, or electronic tablet. It may be loaded by means of a physical connection, for example USB, or wirelessly, for example, 802.11, Ethernet, or 3G protocols. Alternatively, the current transformer 312 can establish the preset value, as previously described.

The digital controller 1112 is adapted to receive information that includes the value of the third current 310. This can be facilitated by wireless communication between the digital controller 1112 and the current transformer 312 using wireless protocol standards known to those skilled in the art, for example, 802.11 or Zigbee. Alternatively, communication of the value of the third current 310 to the digital controller 1112 can be facilitated by modulating a signal on the non-dedicated branch circuit 202 using a standard communication protocol, for example, HomePlug Green, universal power bus (UPB), or X10. Alternatively it can be facilitated by modulating a signal on the non-dedicated branch circuit 202 using pulse-position modulation (PPM), ripple carrier signaling, or any scheme capable of transmitting low bandwidth, narrow-band communication for transmitting information over a residential branch circuit. The communication can also be facilitated by wired transmission, for example, RS-232, RS-485, or analog DC voltage. Means for receiving information representing the value of the third current 310 facilitated through wireless, modulating the power transmission on the non-dedicated branch circuit 202, and by wired transmission have been described previously in this disclosure and illustrated in FIG. 7, FIG. 8, and FIG. 9.

Figure 13:
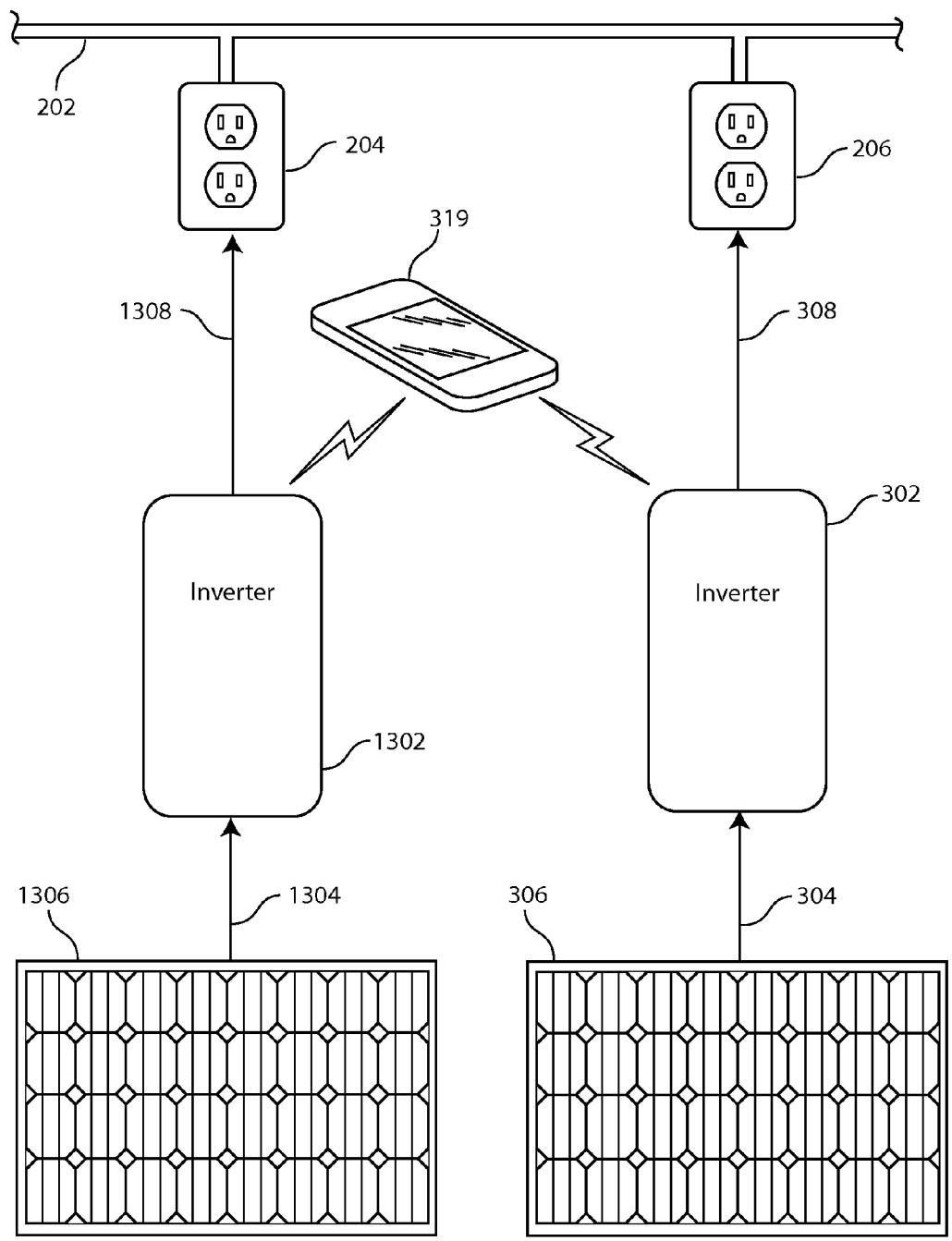
FIG. 13 illustrates an embodiment of an apparatus in accordance with principles of the invention where a plurality of co-generation devices each supplies current to the same non-dedicated branch circuit.

FIG. 13 illustrates an embodiment of an apparatus in accordance with principles of the invention where two or more co-generation devices each supply current to the same non-dedicated branch circuit. Referring to FIG. 3 and FIG. 13, a second inverter 1302 is configured to receive a fourth current 1304 from a solar photovoltaic panel 1306 or other co-generation device. The second inverter supplies a fifth current 1308 into the non-dedicated branch circuit 202 through the first electrical receptacle 204. The second inverter 1302 is adapted to receive information representing the value of a third current 310. The second inverter 1302 is adapted to communicate with the inverter 302. The second inverter 1302 communicates the value of the fifth current 1308 to the inverter 302. Similarly, the inverter 302 communicates the value of the second current 308 to the second inverter 1302. As previously described, the inverter 302 receives the first current 304 from the solar photovoltaic panel 306 and supplies the second current 308 to the branch circuit 202 through receptacle 206.

The inverter 302 and second inverter 1302 can communicate with each other by wireless communication. Wireless communication can include 802.11, Zigbee, and other wireless protocols known to one skilled in the art. Communication between the inverter 302 and second inverter 1302 can include wired communication, for example, RS-485, or RS-232. Communication between the inverter 302 and second inverter 1302 can be facilitating by modulating the AC power signal present on the non-dedicated branch circuit 202 by methods and apparatus previously described in this disclosure.

Figure 14:
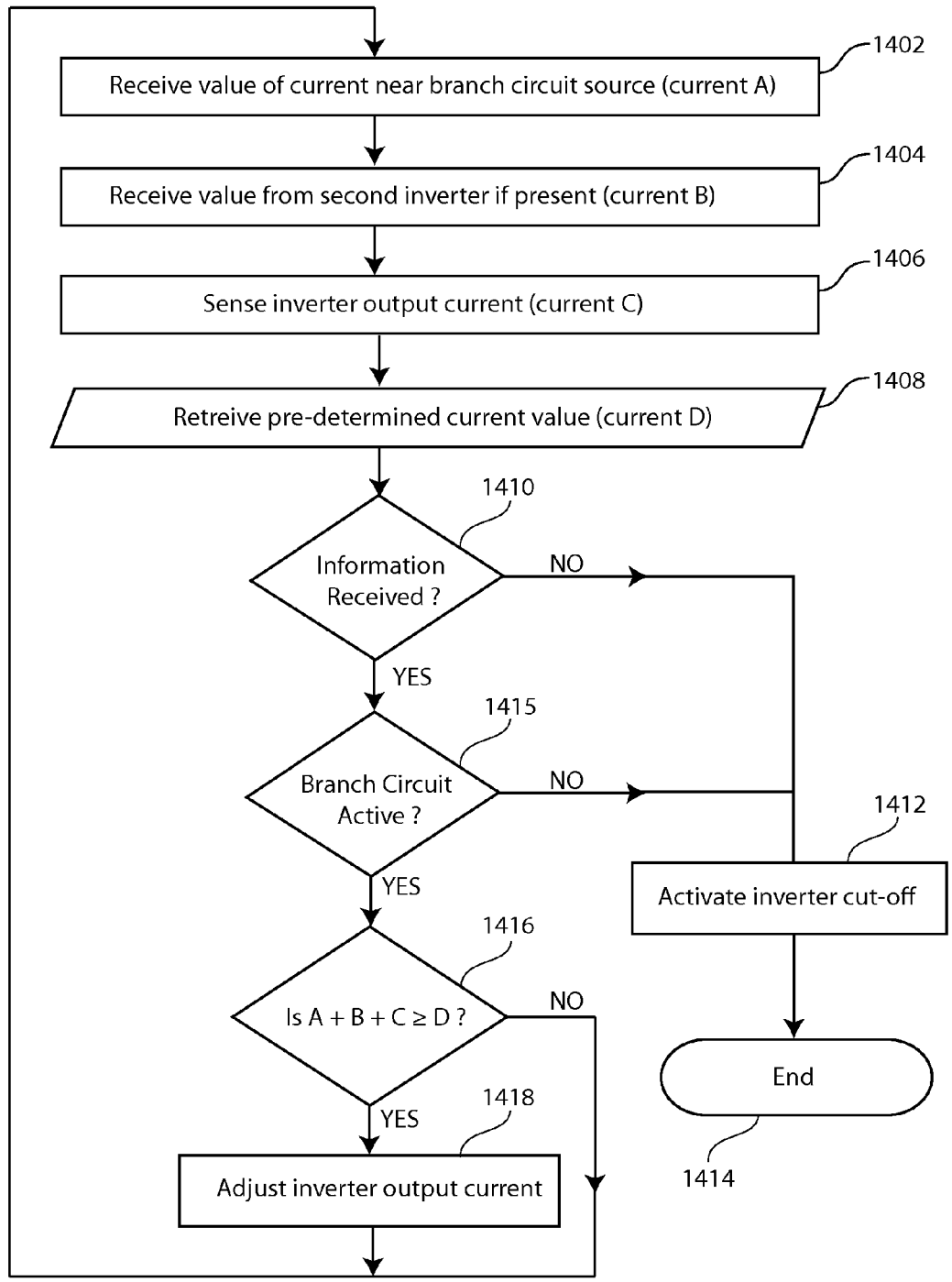
FIG. 14 illustrates a flow chart of in accordance with principles of the invention where a plurality of co-generation devices each supplies current to the same non-dedicated branch circuit.

Referring to FIG. 3, FIG. 13, and FIG. 14, in step 1402, the inverter 302 receives the value of current near the non-dedicated branch circuit 202 source. This is the value of the third current 310, as previously described. In step 1404, the inverter 302 receives the value of the fifth current 1308 from the second inverter 1302, if the second inverter is present. In step 1406, the inverter 302 senses the second current 308. In step 1408, the inverter retrieves the pre-determined value from internal memory. The pre-determined value may be loaded into memory by methods and circuits described in this disclosure, for example, the external processing device 319. In step 1410, if the information containing the value of the third current 310 was not received by the inverter 302 from the current transformer 312 in step 1402, then in step 1412, a disconnect circuit 318 is activated by the inverter 302 in order to stop the second current 308 from flowing into the non-dedicated branch circuit 202 and in step 1414, the process terminates. If the information is received from the current transformer 312, then in step 1415, the inverter 302 checks for the presence of an active branch circuit. This can be tested in manner known to those skilled in the art using "anti-islanding" circuitry within the inverter 302. If branch circuit is not active then in step 1412, the disconnect circuit 318 is activated so that the second current 308 is prevented from flowing from the inverter 302 to the non-dedicated branch circuit 202 and the process is ended in step 1414. If the branch circuit is active, then in step 1416, the inverter 302 adds the three current values: the third current 310, second current 308, and fifth current 1308, and compares the sum to the preset value stored in memory. If the sum of the three current values exceeds the preset value, then in step 1418, the inverter 302 reduces its output current and the process loops back to the beginning. If the sum of the value of the three currents does not exceed the preset value, then the process loops back to the beginning.

Figure 15:
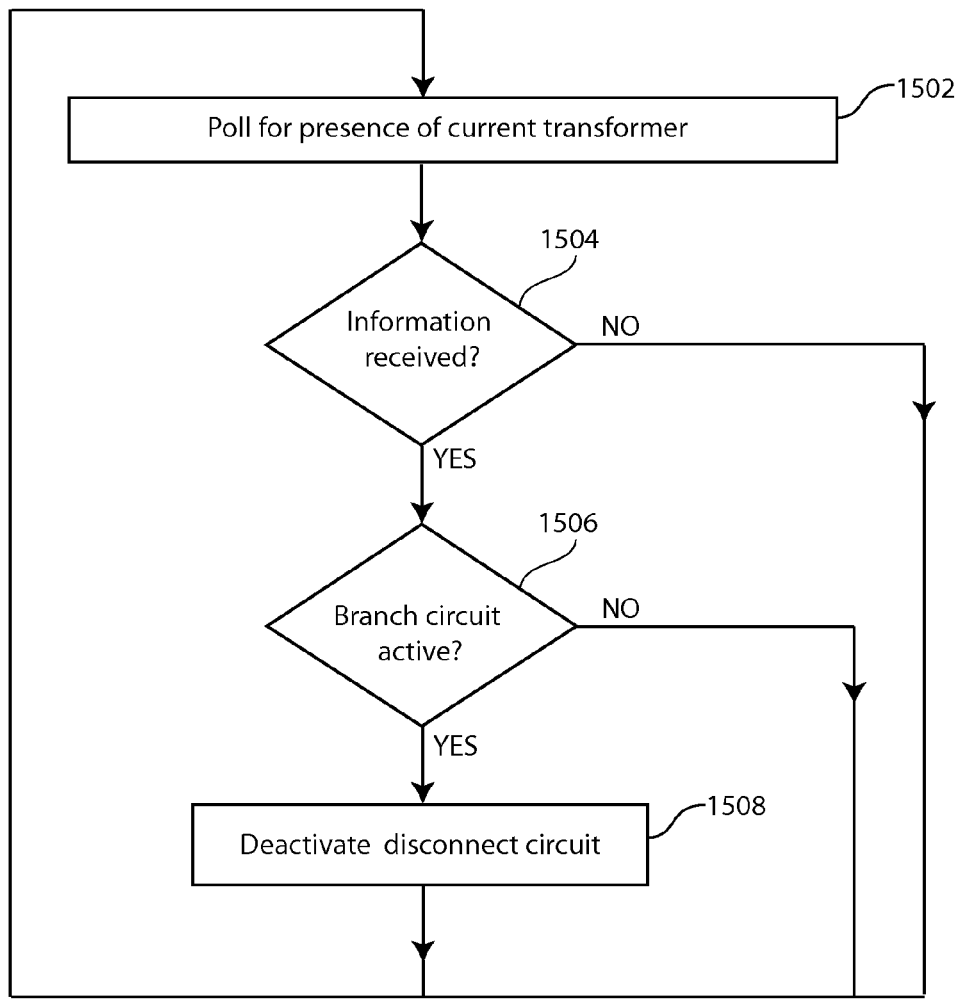
FIG. 15 illustrates a flow chart of a start up sequence where the apparatus in accordance with principles of the invention is adapted to supply the second current only when the information representing the value of a third current is received.

Now referring to FIG. 15, it may be desirable to have the co-generation system supply current to the non-dedicated branch circuit 202 only once communication is established between the current transformer 312 and the inverter 302. FIG. 15 illustrates a flow chart where the inverter 302 is adapted to supply the second current 308 only when the information representing the value of a third current 310 is received during a start-up sequence. Referring to FIG. 3 and FIG. 15, in step 1502, the digital controller 316 polls for the presence of the current transformer 312. In step 1504, if information is not received from the current transformer 312 then sequence starts over. If the information is received from the current transformer 312, then in step 1506 the digital controller 316 checks for the presence of an active branch circuit. This can be tested in manner known to those skilled in the art using "anti-islanding" circuitry within the inverter 302. If the branch circuit is not active, then the sequence starts over. If branch circuit is active, then in step 1508, the disconnect circuit 318 is deactivated so that the second current 308 can flow from the inverter 302 to the non-dedicated branch circuit 202.

Figure 16A:
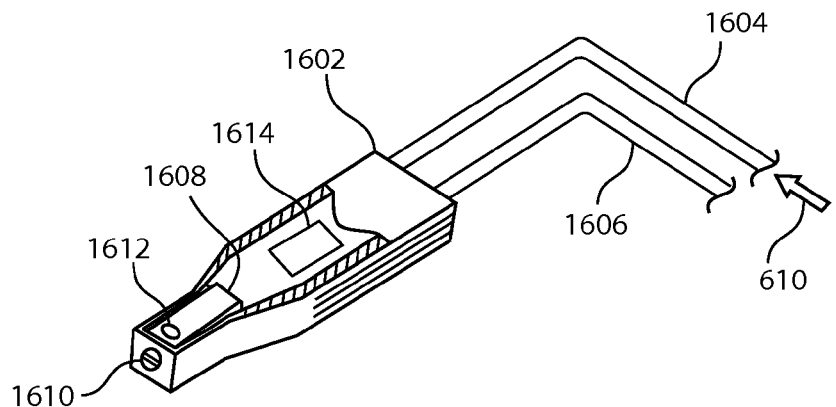
FIG. 16A illustrates an alternate embodiment of a current sensor showing a partial cutaway view of the current sensor top surface.
Figure 16B:
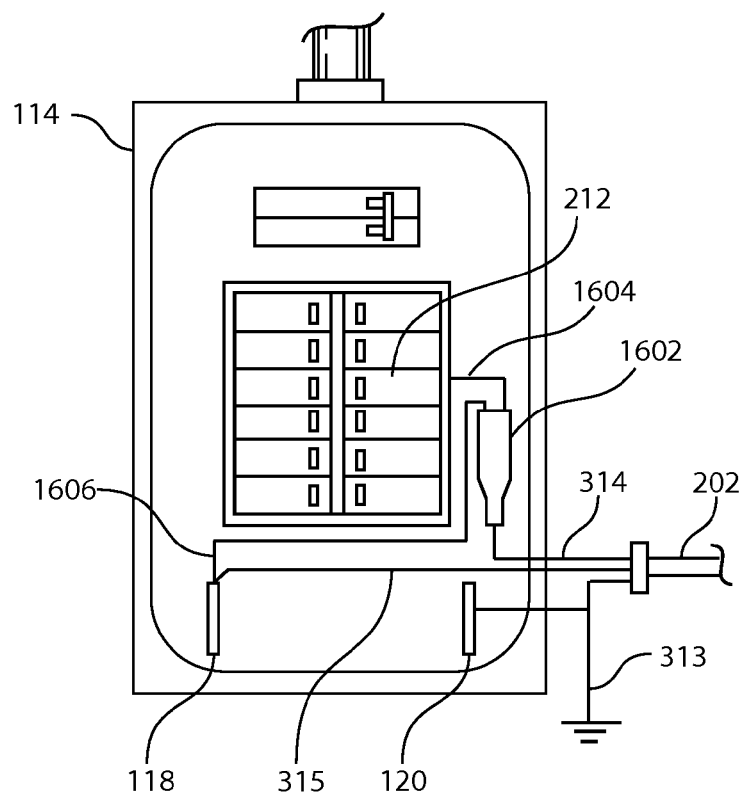
FIG. 16B illustrates the current sensor of FIG. 16A in circuit.

FIG. 16A illustrates an alternate embodiment of a current sensor 1602 adapted for use in accordance with principles of the invention. The top surface of the current sensor 1602 is shown in partial cutaway view. FIG. 16B illustrates the current sensor 1602 adapted to sense current in proximity of the source of the non-dedicated branch circuit 202. Referring to both FIG. 16A and FIG. 16B, the current sensor 1602 is an inline current sensor. The current sensor 1602 includes two pigtail wires, a hot wire 1604, and a neutral wire 1606. The pigtail wires can be connected directly to the internal circuitry of the current sensor 1602 or can connect through terminal blocks within the current sensor 1602. The hot wire 1604 connects to the circuit breaker 212. The neutral wire 1606 connects to the neutral bus bar 118. The hot wire 314 of the non-dedicated branch circuit 202 connects to the current sensor 1602 through a terminal block 1608 within the current sensor. The terminal block is revealed by partial cutaway view of the current sensor 1602 top surface. The neutral return wire 315 of the non-dedicated branch circuit 202 connects to the neutral bus bar 118 and the ground wire 313 connects to the ground bus bar 120 as in the embodiment of FIG. 3. The terminal block includes splicing jaws 1610 that are tightened with a setscrew 1612. The splicing jaws 1610 create an electrical connection between the hot wire 314 and the terminal block 1608.

An inline current sensing circuit 1614, revealed by the partial cutaway view of the current sensor 1602 top surface, can use a current transformer to sense the current by enclosing the hot wire 1604, or sense the current using a hall effect device. Alternatively, the current sensor 1602 can connect in series between the hot wire 1604 connected to the circuit breaker 212 and the hot wire 314 connected to the non-dedicated branch circuit 202 and measures the current flowing between the two wires. The current flowing between the two hot wires is the third current 310 of FIG. 3. The inline current sensing circuit 1614 can include an isolation transformer or can be transformerless in accordance with local jurisdiction safety requirements. The inline current sensing circuit 1614 includes a processor and related circuitry for transmitting the value of the third current 310. This value of the third current 310 can be transmitted wirelessly or through the non-dedicated branch circuit 202 as previously described.

Accordingly, a device for preventing current overload in a non-dedicated branch circuit with power supplied from both the utility grid and a co-generation device with the herein described objectives has been described. Those skilled in the art should appreciate that the invention is not intended to be limited to the above described currently preferred embodiments of the invention. Various modifications will be apparent, particularly upon consideration of the teachings provided herein. Thus, the invention should be understood to extend to that subject matter as defined in the following claims, and equivalents thereof.

What is claimed is:

1. An apparatus configured to supply power from a co-generation device into a non-dedicated branch circuit through an electrical receptacle, comprising:
   a DC to AC inverter configured to receive a first current from the co-generation device and to supply a second current into the non-dedicated branch circuit through the electrical receptacle;
   means for receiving information representing the value of a third current, the value of the third current sensed in proximity to the source of the non-dedicated branch circuit; and
   means for adjusting the second current as a function of the value of the third current so that the apparatus does not cause the third current and the second current in combination to exceed the rated current capacity of the non-dedicated branch circuit.

2. The apparatus of claim 1 wherein means for adjusting the second current as a function of the value of the third current includes a circuit for adjusting a load impedance presented to the first current.

3. The apparatus of claim 1 wherein means for adjusting the second current as a function of the value of the third current includes a maximum power point tracker (MPPT) circuit.

4. The apparatus of claim 1 wherein means for adjusting the second current as a function of the value of the third current includes a disconnect circuit.

5. An apparatus, comprising:
   a DC to AC inverter configured to receive a first current from a co-generation device and to supply a second current into a non-dedicated branch circuit through an electrical receptacle;
   the inverter adapted to receive information representing the value of a third current, the value of the third current sensed in proximity to the source of the non-dedicated branch circuit; and the inverter is adapted to adjust the second current as a function of the value of the third current so that the inverter does not cause the third current and the second current in combination to exceed the rated current capacity of the non-dedicated branch circuit.

6. The apparatus of claim 5 wherein the inverter adjusts the second current as a function of the value of the third current by adjusting a load impedance presented to the first current.

7. The apparatus of claim 5 wherein the inverter adjusts the second current as a function of the value of the third current using a maximum power point tracker (MPPT) circuit.

8. The apparatus of claim 5 wherein the inverter adjusts the second current as a function of the value of the third current using a disconnect circuit.

9. The apparatus of claim 5 wherein the inverter is adapted to receive the information representing the value of the third current by wireless communication.

10. The apparatus of claim 5 wherein the inverter is adapted to receive the information representing the value of the third current through the non-dedicated branch circuit.

11. The apparatus of claim 5 wherein the inverter is adapted to receive and act upon data that identifies the current capacity of the non-dedicated branch circuit.

12. The apparatus of claim 5 wherein the inverter is adapted to supply the second current only when the information representing the value of the third current is received.

13. The apparatus of claim 5, wherein:
the inverter includes a digital controller adapted to determine if a second inverter is supplying a fourth current to the non-dedicated branch circuit, communicating with the second inverter, and adjusting the second current so that the inverter does not cause the second current, the third current, and the fourth current in combination to exceed the rated current capacity of the non-dedicated branch circuit.

14. The apparatus of claim 5, further comprising a solar photovoltaic panel for supplying the first current.

15. A system, comprising:
a DC to AC inverter configured to receive a first current from a co-generation device and to supply a second current into a non-dedicated branch circuit through an electrical receptacle;
means for receiving a signal including information representing the value of a third current, the value of the third current sensed in proximity to the source of the non-dedicated branch circuit;
a current sensor located in proximity to the source of the non-dedicated branch circuit and adapted to sense the third current and transmit the signal; and
means for adjusting the second current as a function of the signal so that the system does not cause the third current and the second current in combination to exceed the rated current capacity of the non-dedicated branch circuit.

16. The system of claim 15 wherein the means for adjusting the second current as a function of the value of the third current includes adjusting a load impedance presented to the first current.

17. The system of claim 15 wherein the means for adjusting the second current as a function of the value of the third current includes a maximum power point tracker (MPPT) circuit.

18. The system of claim 15 further including a solar photovoltaic panel for generating the first current.

19. The system of claim 15 wherein the current sensor is adapted to transmit the signal through the non-dedicated branch circuit.

* * * * *